United States Patent
Tripathi et al.

(10) Patent No.: US 10,380,300 B1
(45) Date of Patent: Aug. 13, 2019

(54) FLEXIBLE POWER QUERY INTERFACES AND INFRASTRUCTURES

(71) Applicant: Mentor Graphics Corporation, Wilsonville, OR (US)

(72) Inventors: Nikhil Tripathi, Noida (IN); Vishnu Kanwar, Faridabad (IN); Manish Kumar, Indirapuram (IN); Srihari Yechangunja, Bangalore (IN)

(73) Assignee: Mentor Graphics Corporation, Wilsonville, OR (US)

( * ) Notice: Subject to any disclaimer, the term of this patent is extended or adjusted under 35 U.S.C. 154(b) by 280 days.

(21) Appl. No.: 14/951,293

(22) Filed: Nov. 24, 2015

Related U.S. Application Data

(62) Division of application No. 13/802,083, filed on Mar. 13, 2013, now Pat. No. 9,201,994.

(51) Int. Cl.
G06F 17/50 (2006.01)

(52) U.S. Cl.
CPC ...... G06F 17/5045 (2013.01); *G06F 17/5022* (2013.01); *G06F 17/5081* (2013.01)

(58) Field of Classification Search
CPC ............. G06F 17/5045; G06F 17/5081; G06F 17/5022
USPC ................ 716/109, 111, 104, 133; 703/16
See application file for complete search history.

(56) References Cited

U.S. PATENT DOCUMENTS

| | | |
|---|---|---|
| 6,915,503 B1 | 7/2005 | Lesea |
| 7,222,317 B1 | 5/2007 | Mathur et al. |
| 7,272,806 B2 | 9/2007 | Frank et al. |
| 7,284,218 B1 | 10/2007 | Roy et al. |
| 7,287,235 B1 | 10/2007 | Hasteer et al. |
| 7,333,032 B1 | 2/2008 | Ramachandran et al. |
| 7,350,168 B1 | 3/2008 | Mathur et al. |
| 7,539,956 B1 | 5/2009 | Xie et al. |
| 7,607,115 B1 | 10/2009 | Kirshnaswamy et al. |
| 7,673,257 B1 | 3/2010 | Bains et al. |
| 7,725,300 B2 | 5/2010 | Pinto et al. |
| 7,761,827 B1 | 7/2010 | Ramachandran et al. |
| 7,813,293 B2 | 10/2010 | Papandriopoulos et al. |
| 7,954,078 B1 * | 5/2011 | Wang .................... G06F 17/505 716/106 |
| 7,966,593 B1 | 6/2011 | Ramachandran et al. |
| 8,020,137 B2 * | 9/2011 | Barrows ............. G06F 17/5036 257/203 |
| 8,032,338 B2 * | 10/2011 | Akselrod ................ G06F 17/50 703/1 |

(Continued)

*Primary Examiner* — Phallaka Kik

(74) *Attorney, Agent, or Firm* — Mentor Graphics Corporation

(57) ABSTRACT

Disclosed below are representative embodiments of methods, apparatus, and systems for performing power analysis during the design and verification of a circuit. Certain exemplary embodiments include user interfaces and software infrastructures that provide a flexible and powerful environment for performing power analysis. For example, embodiments of the disclosed technology can be used to construct complex and targeted power queries that quickly provide a designer with power information during a circuit design process. The disclosed methods can be implemented by a software tool (e.g., a power analysis tool or other EDA tool) that computes and reports power characteristics in a circuit design (e.g., a system-on-a-chip design or other integrated design).

14 Claims, 23 Drawing Sheets

(56) References Cited

U.S. PATENT DOCUMENTS

| | | | |
|---|---|---|---|
| 8,037,443 B1 | 10/2011 | Krishnaswamy et al. | |
| 8,082,530 B1* | 12/2011 | Ou | G06F 17/5036 716/106 |
| 8,117,571 B1 | 2/2012 | Chauhan et al. | |
| 8,122,401 B1 | 2/2012 | Chauhan et al. | |
| 8,146,035 B1 | 3/2012 | Schumacher et al. | |
| 8,205,175 B2 | 6/2012 | Waters et al. | |
| 8,219,949 B2 | 7/2012 | Condon et al. | |
| 8,448,112 B1* | 5/2013 | Kashai | G06F 17/5036 716/104 |
| 8,621,413 B1 | 12/2013 | Xie | |
| 8,667,434 B1 | 3/2014 | Kim et al. | |
| 8,712,741 B2* | 4/2014 | Perry | G06F 17/50 703/19 |
| 8,726,224 B1* | 5/2014 | Giangarra | G06F 17/5036 716/132 |
| 8,938,705 B1* | 1/2015 | Chang | G06F 17/505 716/133 |
| 8,954,904 B1* | 2/2015 | Loh | G06F 17/505 716/103 |
| 8,972,751 B2* | 3/2015 | Perry | G06F 17/505 703/1 |
| 9,002,694 B2* | 4/2015 | Feng | G06F 17/5036 703/18 |
| 9,201,994 B1 | 12/2015 | Tripathi et al. | |
| 2003/0182639 A1 | 9/2003 | Lehner et al. | |
| 2003/0208733 A1 | 11/2003 | Sokolov | |
| 2005/0050481 A1 | 3/2005 | Keller et al. | |
| 2005/0060342 A1 | 3/2005 | Farag | |
| 2005/0204316 A1 | 9/2005 | Nebel et al. | |
| 2005/0278676 A1 | 12/2005 | Dhanwada et al. | |
| 2006/0080076 A1 | 4/2006 | Lahiri et al. | |
| 2006/0095881 A1 | 5/2006 | Kwon et al. | |
| 2006/0123374 A1 | 6/2006 | Douriet | |
| 2006/0129954 A1 | 6/2006 | Schuppe | |
| 2006/0242616 A1 | 10/2006 | Iotov | |
| 2007/0043716 A1 | 2/2007 | Blewer et al. | |
| 2007/0069764 A1 | 3/2007 | Lewis et al. | |
| 2007/0083831 A1 | 4/2007 | Hamilton et al. | |
| 2007/0245278 A1* | 10/2007 | Chen | G06F 17/5022 716/109 |
| 2008/0092092 A1 | 4/2008 | Dalton et al. | |
| 2008/0126999 A1 | 5/2008 | Wang | |
| 2008/0127014 A1* | 5/2008 | Pandey | G06F 17/5045 716/103 |
| 2008/0127015 A1* | 5/2008 | Chandramouli | G06F 17/5022 716/103 |
| 2009/0089725 A1* | 4/2009 | Khan | G01R 31/31721 716/106 |
| 2009/0289696 A1 | 11/2009 | Lewis et al. | |
| 2010/0192115 A1* | 7/2010 | Yang | G06F 17/5022 716/104 |
| 2010/0199246 A1* | 8/2010 | Huynh | G06F 17/5063 716/118 |
| 2010/0199247 A1* | 8/2010 | Huynh | G06F 17/5063 716/119 |
| 2010/0199249 A1* | 8/2010 | Huynh | G06F 17/5072 716/55 |
| 2010/0199250 A1* | 8/2010 | Huynh | G06F 17/5072 716/120 |
| 2010/0199254 A1* | 8/2010 | Huynh | G06F 1/3203 716/127 |
| 2010/0269074 A1* | 10/2010 | Nation | G06F 17/5022 716/136 |
| 2010/0295606 A1 | 11/2010 | Tsuchiya | |
| 2010/0306722 A1* | 12/2010 | LeHoty | G06F 17/5036 716/106 |
| 2010/0312526 A1 | 12/2010 | Chauvin et al. | |
| 2010/0318946 A1 | 12/2010 | Hamilton et al. | |
| 2010/0325599 A1* | 12/2010 | Perry | G06F 17/50 716/122 |
| 2011/0197172 A1* | 8/2011 | Yamamoto | G01R 31/31836 716/111 |
| 2011/0288829 A1 | 11/2011 | Bickford et al. | |
| 2011/0302550 A1 | 12/2011 | Jackson et al. | |
| 2011/0320848 A1 | 12/2011 | Perry et al. | |
| 2012/0079437 A1 | 3/2012 | Li et al. | |
| 2012/0198408 A1* | 8/2012 | Chopra | G06F 17/504 716/127 |
| 2012/0216160 A1 | 8/2012 | Buechner et al. | |
| 2013/0275933 A1 | 10/2013 | Hsu et al. | |
| 2013/0305207 A1* | 11/2013 | Hsieh | G06F 17/5009 716/136 |
| 2013/0338991 A1* | 12/2013 | Lin | G06F 17/5036 703/14 |
| 2014/0013293 A1* | 1/2014 | Hsu | G06F 17/5022 716/133 |
| 2015/0186578 A1 | 7/2015 | LeHoty et al. | |
| 2016/0012171 A1* | 1/2016 | Visconti | G06F 17/5072 716/122 |

* cited by examiner

US 10,380,300 B1

FLEXIBLE POWER QUERY INTERFACES AND INFRASTRUCTURES

CROSS REFERENCE TO RELATED APPLICATIONS

This application is a divisional of U.S. patent application Ser. No. 13/802,083, filed Mar. 13, 2013, entitled "FLEXIBLE POWER QUERY INTERFACES AND INFRASTRUCTURES," which is hereby incorporated herein by reference in its entirety.

FIELD

This application relates to power analysis tools and techniques for performing power computations and optimizations during the design and verification of a circuit.

SUMMARY

Disclosed below are representative embodiments of methods, apparatus, and systems for performing power analysis during the design and verification of a circuit. Certain exemplary embodiments include user interfaces and software infrastructures that provide a flexible and powerful environment for performing power analysis. For example, embodiments of the disclosed technology can be used to construct complex and targeted power queries that quickly provide a designer with power information during a circuit design process. The disclosed methods can be implemented by a software tool (e.g., a power analysis tool or other EDA tool) that computes and reports power characteristics in a circuit design (e.g., a system-on-a-chip design or other integrated design). The disclosed methods, apparatus, and systems should not be construed as limiting in any way. In general, the present disclosure is directed toward all novel and/or nonobvious features and aspects of the various disclosed embodiments, alone or in various combinations and subcombinations with one another.

DETAILED DESCRIPTION

I. General Considerations

Figure 1:
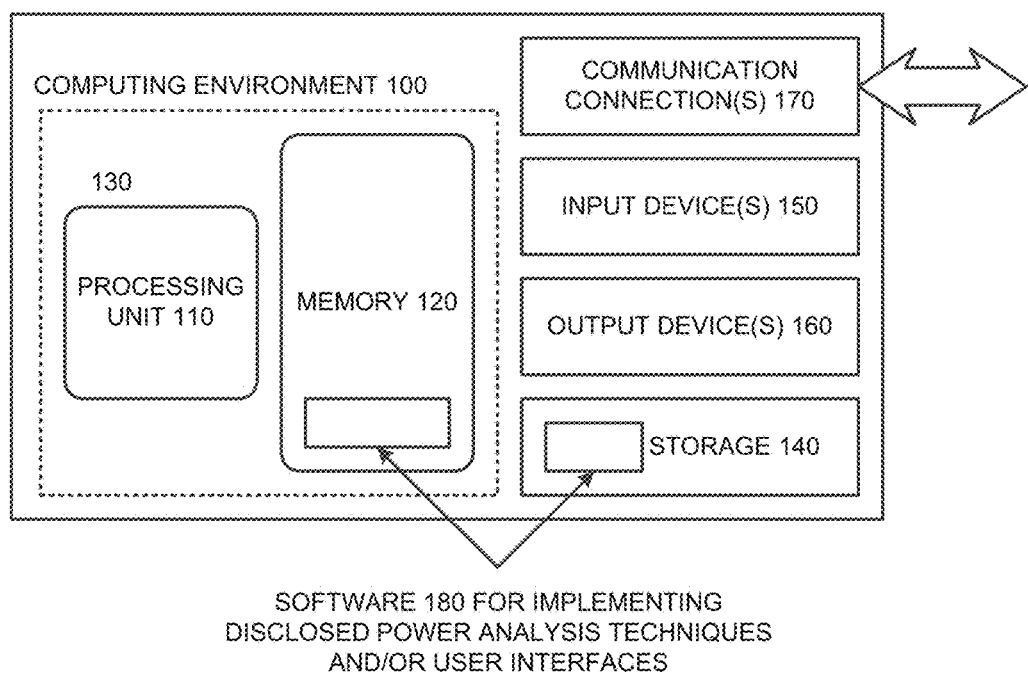
FIG. 1 is a block diagram illustrating a computing environment in which aspects of the disclosed technology can be performed.

Disclosed below are representative embodiments of methods, apparatus, and systems for performing power analysis during the design and verification of a circuit. Particular embodiments include user interfaces and software infrastructures that provide a flexible and powerful environment for performing power analysis. The disclosed methods can be implemented by a software tool (e.g., a power analysis tool or other EDA tool) that computes and reports power characteristics in a circuit design (e.g., a system-on-a-chip design or other integrated design). The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "identify" to describe the disclosed methods. These terms are high-level abstractions of the actual operations that are performed. The actual operations that correspond to these terms may vary depending on the particular implementation and are readily discernible by one of ordinary skill in the art. Additionally, as used herein, the term "and/or" means any one item or combination of any items in the phrase.

II. Exemplary Computing Environments for Implementing Embodiments of the Disclosed Technology Any of the disclosed methods can be implemented as computer-executable instructions stored on one or more computer-readable media (e.g., one or more optical media discs, volatile memory components (such as DRAM or SRAM), or nonvolatile memory components (such as hard drives)) and executed on a computer (e.g., any suitable computer, including desktop computers, servers, tablet computers, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), a distributed computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can alternatively be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")).

FIG. 1 illustrates a generalized example of a suitable computing environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 implementing one or more of the described power analysis or power query generating tools or techniques described herein. For example, the memory 120 can store software 180 for implementing any of the disclosed techniques described herein and their accompanying user interfaces.

The computing environment can have additional features. For example, the computing environment 100 includes storage 140, one or more input devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory non-volatile storage medium which can be used to store information and which can be accessed within the computing environment 100. The storage 140 can also store instructions for the software 180 implementing any of the described techniques, systems, or environments.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 100, computer-readable media include tangible non-transitory computer-readable media, such as memory 120 and/or storage 140.

The various methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
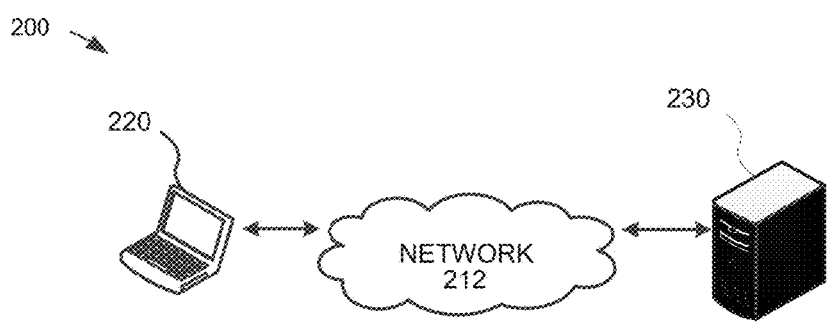
FIG. 2 is a block diagram showing an exemplary network environment in which aspects of the disclosed technology can be performed.

An example of a possible network topology 200 (e.g., a client-server network) for implementing a system using the disclosed technology is depicted in FIG. 2. Networked computing device 220 can be, for example, a computer running a browser or other software connected to a network 212. The computing device 220 can have a computer architecture as shown in FIG. 1 and discussed above. The computing device 220 is not limited to a traditional personal computer but can comprise other computing hardware configured to connect to and communicate with a network 212 (e.g., tablet computers, mobile computing devices, servers, network devices, dedicated devices, and the like). In the illustrated embodiment, the computing device 220 is configured to communicate with a server 230 (e.g., a remote server, such as a server in a cloud computing environment) via a network 212. In the illustrated embodiment, the computing device 220 is configured to transmit input data to the server 230 and the server 230 is configured to implement any of the disclosed methods and provide results to the computing device 220. Any of the data received from the computing device 230 can be stored or displayed on the computing device 220 (e.g., displayed as data on a graphical user interface or web page at the computing devices 220). In the illustrated embodiment, the illustrated network 212 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 212 can be the Internet or a similar public network and operate using an appropriate protocol (e.g., the HTTP protocol).

Figure 3:
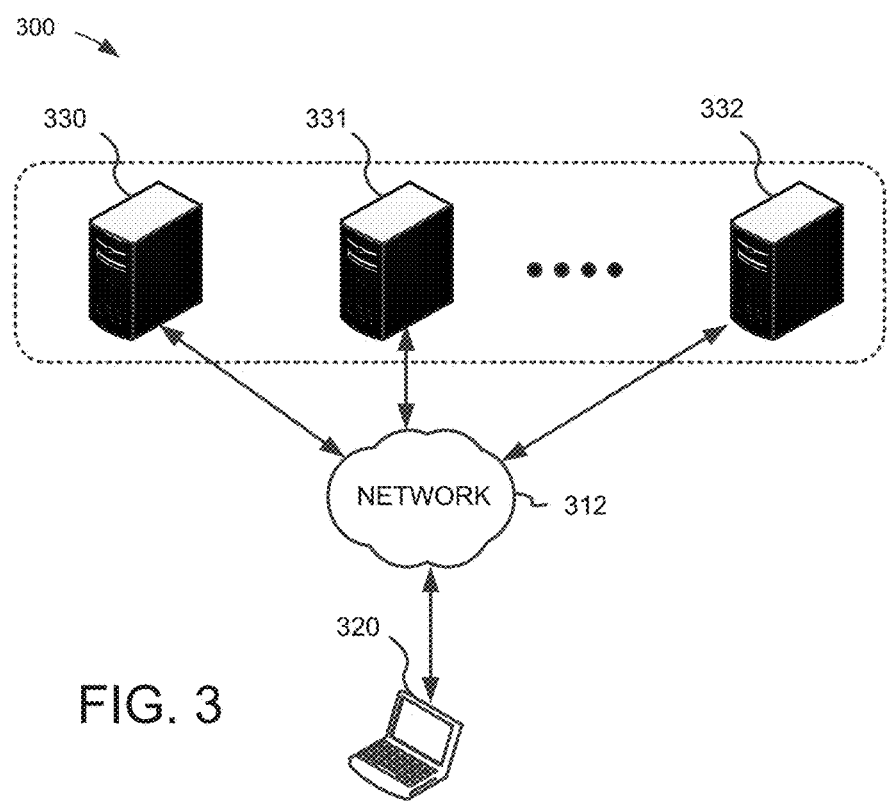
FIG. 3 is a schematic block diagram of another exemplary network environment in which aspects of the disclosed technology can be performed.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment) via the network 312. In the illustrated embodiment, each of the computing devices 330, 331, 332 in the computing environment 300 is used to perform at least a portion of the power analysis or power query generating process. In other words, the computing devices 330, 331, 332 form a distributed computing environment in which the analysis or power query generating process is shared across multiple computing devices. The computing device 320 is configured to transmit input data to the computing devices 330, 331, 332, which are configured to distributively implement an analysis or power query generating process, including performance of any of the disclosed methods, and to provide results to the computing device 320. Any of the data received from the computing devices 330, 331, 332 can be stored or displayed on the computing device 320 (e.g., displayed as data on a graphical user interface or web page at the computing devices 320). The illustrated network 312 can be any of the networks discussed above with respect to FIG. 2.

III. Embodiments of the Disclosed Power Analysis Tools and Techniques

A. Introduction

Circuit designers are often interested in understanding the impact on design power for various types of design changes. For example, power can be impacted with changes to a design's mode of operation (e.g., the operating voltage of a design or module, the target technology (for instance, whether the target technology operates using a low or high voltage), the functional mode of the design (such as whether the design is used for audio applications, video applications, transmission applications, or receiving applications), and/or the operating frequency of the design). Power can also be affected by the design itself (e.g., whether the design includes data gating or operand isolation of certain operators, whether the design uses flop cloning or sharing, whether the design uses power gating, and/or whether the design comprises power gating or banking).

Among the embodiments disclosed herein are embodiments of a software tool referred to as the power query interface ("PQI"). The PQI provides a mechanism that allows users to easily express the intent of a design change, evaluate multiple design changes together, and/or increase the speed of the evaluation process. The PQI can be implemented as a usability enhancement to power analysis tools that perform power computations and/or optimization for SoCs or other circuit designs.

In certain implementations, the PQI evaluates the effects of power through the use of a "power context" (sometimes referred to simply as a "context"). In general, a power context is a set of specifications that specifies the power intent of a portion of digital logic. The power context can account for the functional mode in which the design is operating, the design environment, and the design itself. Using embodiments of the disclosed technology, one or more power contexts for a design or design portion can be easily modified by a user. Further, the use of a power context allows a user to more flexibly explore how changes can affect the power usage in a design or design portion using design concepts and queries that are more understandable to a circuit designer. In particular, separate power contexts can be specified by a user to capture the "when", "where", "what if" and/or "powerspec" for a particular design or design change. More specifically, the "when" power context refers to the specification of a power mode of interest or timeline of interest (e.g., a design operation mode or a specific simulation timeline); the "where" power context refers to the specification of one or more design objects and power characteristics of interest (e.g., points of interests); the "what if" power context refers to specification of a design change (which typically results in a netlist change); and the "powerspec" context refers to the specification of operating conditions (such as voltage). The disclosed power contexts (and their associated syntaxes and rules) can be used to provide an extensible query language that is able to handle arbitrary power queries and to provide quick feedback on the power impact of a change. Furthermore, the PQI provides a mechanism through which an engineer can more easily develop templates, which can then be applied by the rest of a design team to their RTLs.

Embodiments of the PQI comprise one or more underlying technologies that drive the power analysis. For example, certain embodiments of the PQI use an incremental design database, an incremental power analysis tool, a simulation database that can be queried, and/or a database maintaining electrical power intent information. The incremental design database allows a portion of the design to be quickly changed. In certain implementations, the design database can be changed and restored to its original state. Furthermore, certain implementations use a transactor-based mechanism with the incremental design database to supply alternate views of the design portion. The incremental power analysis tool provides the ability to perform power analysis on the whole design or just a portion thereof. The incremental power analysis tool also provides the ability to change operating conditions, design modes, etc., and perform an evaluation of the impact of the changes to whole design or a portion thereof. The simulation database provides the ability to perform arbitrary queries on simulation timelines or the expression of logical relationships among design signals. In certain implementations, the simulation database can be populated using VCD/FSDB data. Electrical power intent information (such as operating voltage) may be specified via UPF/CPF files and be stored in a database linked to the design database. The incremental design database, incremental power analysis tool, simulation database, and/or the electrical power intent database can be implemented using a variety of technologies, but in one exemplary embodiment comprises software modules and tools used in PowerPro® available from Calypto Design Systems.

B. Exemplary Power Query Interface Embodiments

Embodiments of the disclosed technology comprise a power query interface that allows a user to easily modify the inputs to a power analysis problem without having to individually modify the inputs to each analysis tool involved in the analysis process or rewrite the power analysis query for each incremental design change that the circuit designer wishes to analyze. For example, there are various inputs to the power analysis problem which are typically handled individually by a user using distinct power analysis tools. The inputs to the problem can include, for example, the design represented as a netlist; switching activity captured in a VCD or SAIF file; operating conditions expressed as a wireload model or physical characteristic library (technology library); design constraints/output loads; and electrical power intent specification provided as a UPF/CPF file. Embodiments of the disclosed PQI provide a unified interface through which these inputs can be modified with little effort by the user or, in some cases, automatically.

In certain embodiments, the PQI can serve one or more of the following types of queries: (1) peak power analysis; (2) anomaly detection; (3) electrical power intent change query; and (4) "what-if" analysis. The first three are coarse-grained queries, while the last is a fine-grained query. An example of a peak power analysis query is the following: calculate the power of a design for a time window equal to the clock period for which there is maximum toggle activity. Embodiments of the PQI can handle one or more additional variations of the peak power analysis, such as one or more of the following: a change of scope query (e.g., the power of a particular hierarchy, power of all flops, power of memories only, power of 2-ported memories in the design, datapath power, etc.); a change of time window query (e.g., a different time window length, power averaged over the top five time windows); and what-if queries that represent changes in the input design (e.g., what would happen to the peak power if some memories are split for light-sleep?). An example of an anomaly detection query is the following: does a block consume a surprising amount of power when it should be idle? Embodiments of the PQI can handle refinements of this type of query as well, such as: is there a block that consumes power greater than a threshold when a particular mode is set? Variations similar to those for peak power analysis query are possible as well. An example of an electrical power intent change query is as follows: how much power can be saved on a block if it is operated at a particular voltage? A variation on such a query would be an additional parameter of a window of the VCF/FSDB data when the block is idle or its activity is low. An example of a what-if analysis query is as follows: would I save power if the following memories in my design were partitioned by 2 and the partitions operated in light sleep mode according to whether the partition was active?

More generally, embodiments of the power query interface disclosed herein allow a user to: (1) constrain the simulation window for different modes (in specific implementations, this is performed using the "when" context); (2) restrict the regions for analysis (in specific implementations, this is performed using the "where" context); (3) allow portions of the design to be modified (in specific implementations, this is performed using the "what-if" context; (4) allow electrical power intent of portions of the design to be modified, this is performed using the "powerspec" context; and/or (5) report different power analysis metrics for regions/objects/modes. Furthermore, in particular embodiments, the "when", "where", "what-if" and "powerspec" contexts can be combined with one another in combinations and subcombinations, thus allowing the user to combine the queries in arbitrary ways to provide a rich interface for understanding power implications from design changes.

Figure 4:
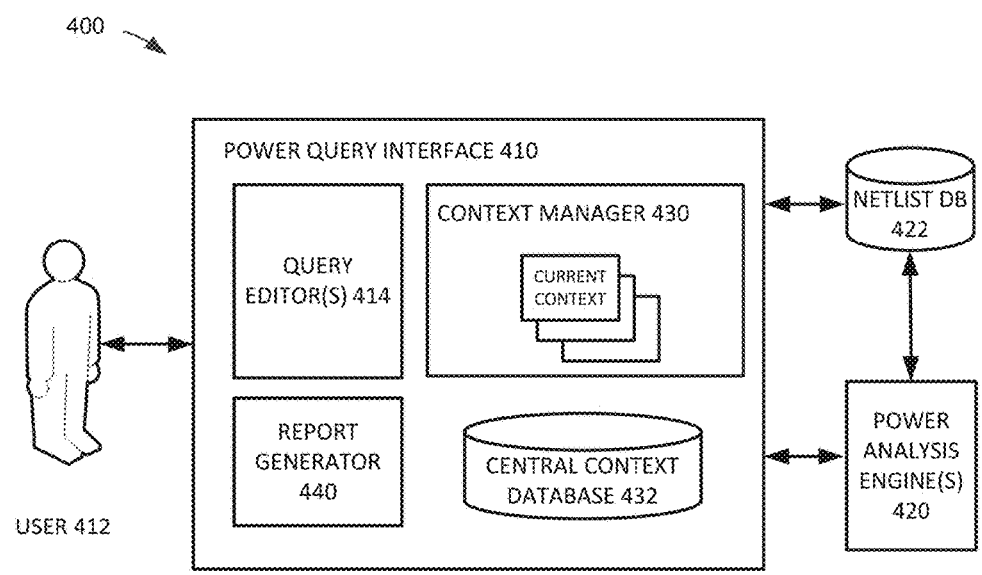
FIG. 4 is a block diagram illustrating an exemplary power query interface ("PQI") layer along with other components that are used in the power analysis environment.

FIG. 4 is a block diagram 400 illustrating an exemplary PQI (including some of its components) along with other components that are used in the power analysis environment. The particular arrangement shown in FIG. 4 should not be construed as limiting, however, as embodiments of the disclosed technology can be realized in a variety of different arrangements.

PQI 410 forms an interface between a user 412 and one or more power analysis engines 420 (each designed to perform a particular analysis task). The power analysis engine(s) 420 can compute the power and/or signal activity for a given netlist (stored in netlist database 422 in FIG. 4) under given environment specifications defined in the power analysis query used to execute the power analysis engine. The engine(s) 420 or components supporting the engine(s) can include the incremental design database, incremental power analysis tool, and/or simulation database discussed above. The engine(s) 420 or components supporting the engine(s) can also include one or more of an engine for computing switching activity propagation, an incremental logic synthesis component, a clock gating optimization component. The engine for computing switching activity propagation computes the switching activity for regions of a design (e.g., regions selected by a user and/or regions not selected by the user). Switching activity represents the logic transitions that occur within the design when operating. Power estimation and analysis typically requires accurate information about switching activity of the design. The incremental logic synthesis engine performs a synthesis process by which a register transfer level ("RTL") description (or other hardware description language ("HDL") description) of the circuit is converted into a gate-level description (e.g., a netlist). The incremental logic synthesis engine allows for modification of only a certain portion of the design without having to redo the entire synthesis process for the modified design. The clock gating component involves identifying enable conditions in the design and then using them to gate the clock. These enable conditions can be generated to hold the data in flip-flop elements if new data is not required in the downstream logic or when data is unchanging or invalid. This engine can react to the incremental changes to design without being required to trigger analysis for the complete design again.

The PQI 410 introduces the concept of contexts while dealing with such engines. The user 412 can define a context through one or more query editors 414 provided by the PQI 410, and the PQI can generate and send the engine a power analysis query having requirements as per the context. For example, the context may contain information about the simulation period, objects of interest, what-if intent, electrical power intent etc.

In the illustrated embodiment, the contexts are managed by a context manager 430 of the PQI 410. Analysis results are stored in a central context database 432 and can be referred to by a context name to generate various reports (generated, for example, by a report generator 440) or to be referred in further queries. In certain implementations, a context (e.g., the "what-if" context) causes a change in the netlist, and this change can be stored and rolled back when a user switches the context or rejects the change proposed by the "what-if" context.

Figure 5:
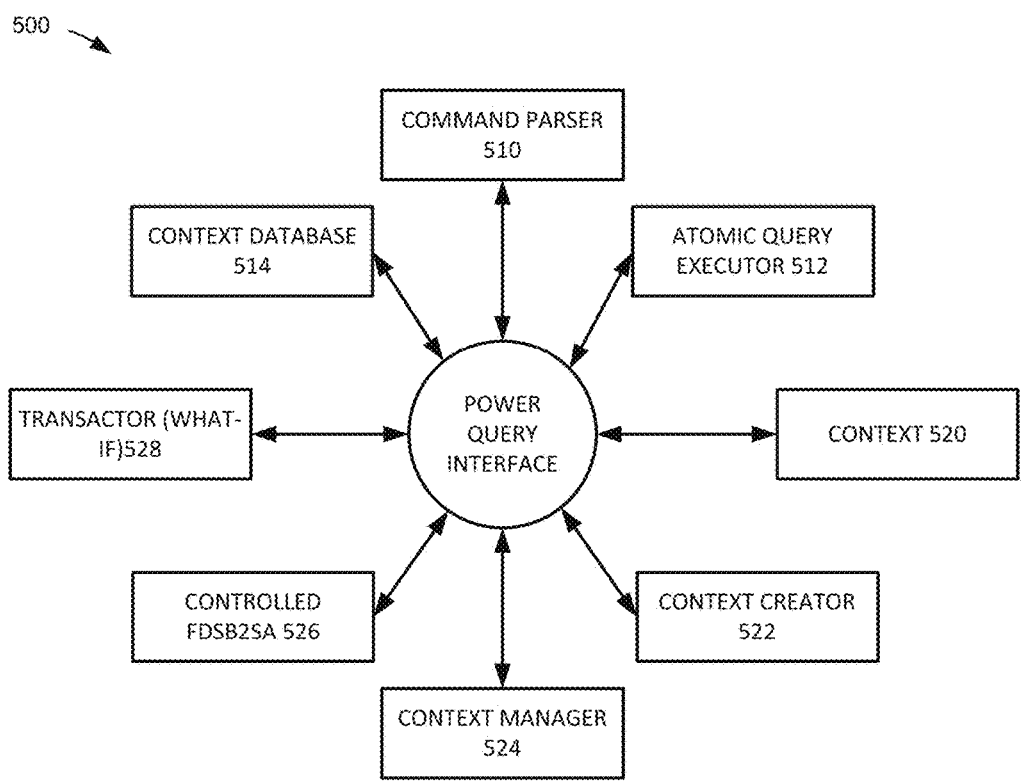
FIG. 5 is a block diagram showing various components and/or modules that can be used alone or in combination with one another in certain exemplary embodiments of the PQI.

FIG. 5 is a block diagram 500 showing various components and/or modules that can be used alone or in combination with one another in certain embodiments of the PQI. As more fully explained below, embodiments of the PQI allow the user to easily create power analysis commands having a predefined syntax using user-friendly interfaces. The resulting commands can be used to build contexts for the power analysis query. For example, contexts that are in the context database can be displayed to the user, the PQI can allow the user to select from the available contexts and create combinations of the context by chaining the contexts into a command for the one or more power analysis engines (such a command is sometimes referred to herein as a "power analysis query"). In particular implementations, the commands may refer to identities in the context database.

In FIG. 5, command parser 510 is a parser programmed to tokenize the command/query arguments (e.g., the queries input by a user). Atomic query executor 512 comprises a set of sub-expression solvers that interact with the context database 514, activity files (not shown) (e.g., VCD, FSDB, and/or GAF files), electrical power intent files (e.g., UPF/CPF files) and the one or more power analysis engines (e.g., the power analysis engine(s) 420) to serve atomic queries. Context 520 is a specification of a selected power intent and/or power region. Examples of how contexts are created and used to perform a power query are discussed at length below. Context creator 522 is programmed to create a context out of a parsed tree with the help of the atomic query executor 512. Context manager 524 manages the contexts and, in certain embodiments, is responsible for rolling and unrolling a context on demand. Controlled FSDB2SA 526 and transactor 528 are components of the atomic query executor 512. In particular embodiments, the controlled FSDB2SA 526 and transactor 528 are the tools used in simplifying the activity component of a user query and in simplifying the "what-if" component of the user query, respectively.

Figure 6:
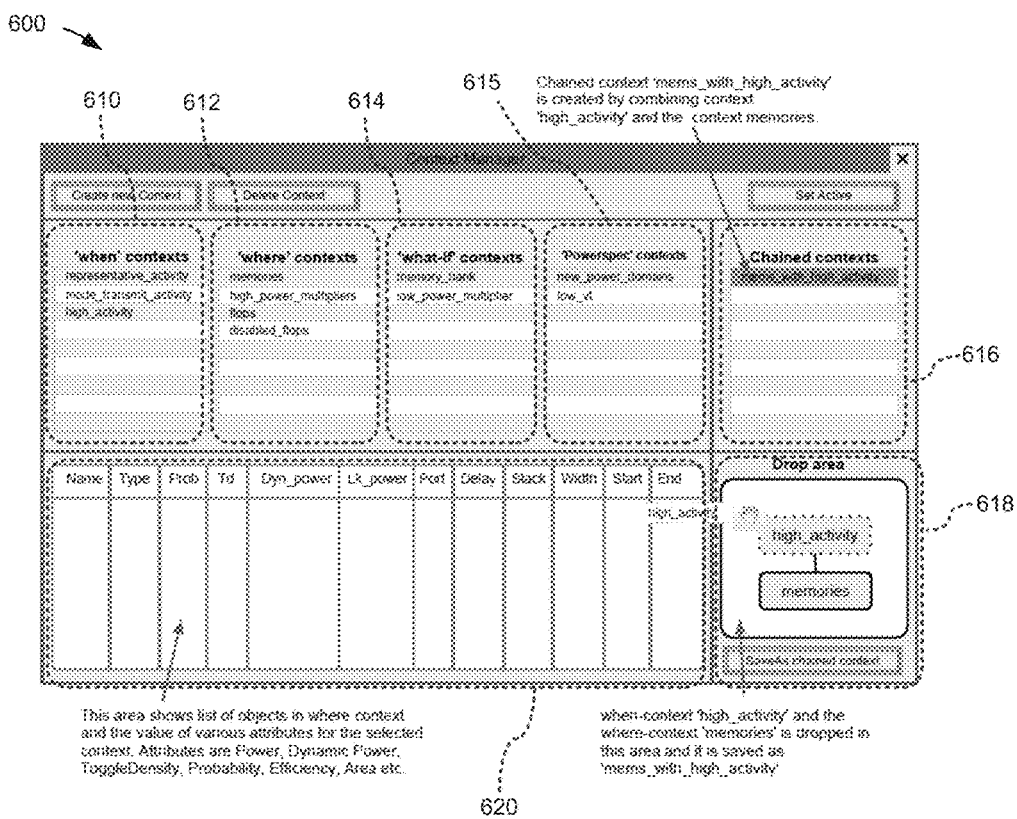
FIG. 6 is a screenshot of an exemplary graphic user interface for a context manager.

FIG. 6 is a screenshot of an exemplary graphic user interface 600 for a context manager (e.g., context manager 524). The context manager can be used to allow a user to create and manage contexts. The user interface 600 provides the user with a mechanism for creating, managing, and applying contexts. In general, the context manager helps in creating new contexts. As can be seen, the context manager user interface 600 includes stored context regions 610, 612, 614, 615, which display previously created and stored context according to context type. In particular, the user interface 600 includes a context region 610 for "when" contexts, a context region 612 for "where" contexts, a context region 614 for "what-if" contexts and a context region 615 for "powerspec" contexts.

The user interface 600 also allows includes a chained context region 616 and a drag-and-drop region 618 that facilitates the formation of new contexts by combining more than one context with each other. For instance, in the illustrated embodiment, to form a new context by mixing existing contexts, the context manager user interface 600 provides a drag-and-drop region 618. The user can select a desired context from one of the context regions 610, 612, 614, 615, and drag and drop it into the drag and drop region 618 (e.g., using a click-and-drag operation). The context manager can then build a chained context from the contexts that are input into the pick and drop area 618. For instance, in the illustrated screen shot, a user has selected two contexts to be connected: the "high_activity" context from the "when" context region 610 and the "memories" context form the "where" context region 612, indicating the desire to build a chained power analysis query that performs a power analysis of the "memories" of a design during a "high_activity" state. The resulting chained context, which can be automatically labeled using the labels of the previously created contexts, can be automatically generated and appear in the chained context region 616. For instance, in the illustrated embodiment, the chained context "mems_with_high_activity" is displayed in the chained context region 616.

The context manager graphic user interface 600 also includes an active context region 620 that displays expanded information about a selected one or more contexts. For instance, a user can select one or more of the contexts from the context regions 610, 612, 614, 615 and have additional information about the selected region appear in the active context region 620. In general, the active context region 620 displays one or more attributes of the selected contexts, including results from power analyses performed for the context. In the illustrated embodiment, for instance, the active context region 620 is configured to display attributes for any of the contexts in the "where" contexts region 612, including name, type, power, dynamic power, toggle, density, probability, efficiency, area, and other such attributes.

In the illustrated embodiment, a user can select any one or more desired contexts to make them active. For instance, once selected, the user interface 600 will start displaying and operating on that active context (e.g., by showing the attributes for the selected context in the active context region 620). The context manager user interface 600 allows deletion/creation of contexts, as described in later sections.

1. Creating Exemplary "When" Contexts

This section describes exemplary processes for creating a "when" context using embodiments of the disclosed technology. The disclosed processes should not be construed as limiting, as a "when" context can be generated using a variety of techniques. In one exemplary embodiment, the power query interface user interface (e.g., user interface 600) offers one or more ways of creating a "when" context. For instance, one or more of the following context creation mechanisms can be used: (1) a "when" context creator accessible from the power query interface graphic user interface; (2) an RTL editor; and/or (3) an activity profiler. Additional details concerning these possible mechanisms are provided below.

a. An Example "When" Context Creator Implementation

In one example implementation, a "when" context creator is available for use through the power query interface graphic user interface. The "when" context creator can provide the flexibility of specifying a "when" context based on design signal values and their logical ANDing/ORing. For example, a "when" context like "(mode_Sig1==1'b0) & (control_sig_x !=1'b0)" can be created with the help of the "when" context creator.

Figure 7:
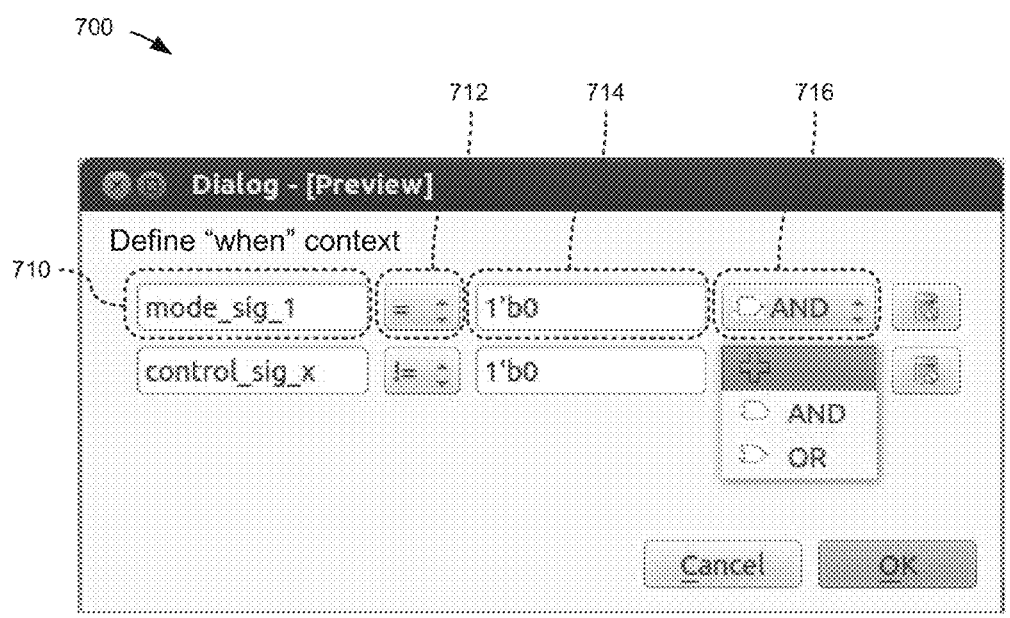
FIG. 7 is an exemplary editor for a "when" context creator.

One exemplary editor 700 for a "when" context creator is shown in FIG. 7. Using the editor 700, a user can specify a signal name and its value and can optionally add one or more additional signals that are ANDed or ORed together. In the illustrated embodiment, the interface 700 includes a signal name field 710 for inputting a signal name, a relational selector 712 for designating a relationship of the signal to an attribute (e.g., a selector designating whether a signal "equals" an attribute or "does not equal" an attribute), and an attribute field 714 for designating a desired value of an attribute of the signal. The interface 700 illustrated in FIG. 7 further includes a Boolean selector 716 for selecting a Boolean operator (e.g., an AND or an OR Boolean operator) to join the identified signal and attributes with additional signals and attributes, thereby forming a more complex context. In the illustrated embodiment, an "AND" Boolean operator is selected for the first signal and a second row comprising a second signal name field, a second relational selector, and a second attribute field are displayed. For the user's ease, auto-completion of signal names can be provided (e.g., when the user starts typing a name in the text field it suggests the full name of the signal based on precedence).

b. An Example RTL Editor Implementation

The user interface 700 of the context manager can also allow a user to access an RTL editor or other HDL editor. Using the RTL editor, a "when" context can be created by providing a raw "boolean expression" as a string or an equivalent Verilog (or other HDL) module.

c. An Example Activity Profiler Example

Figure 8:
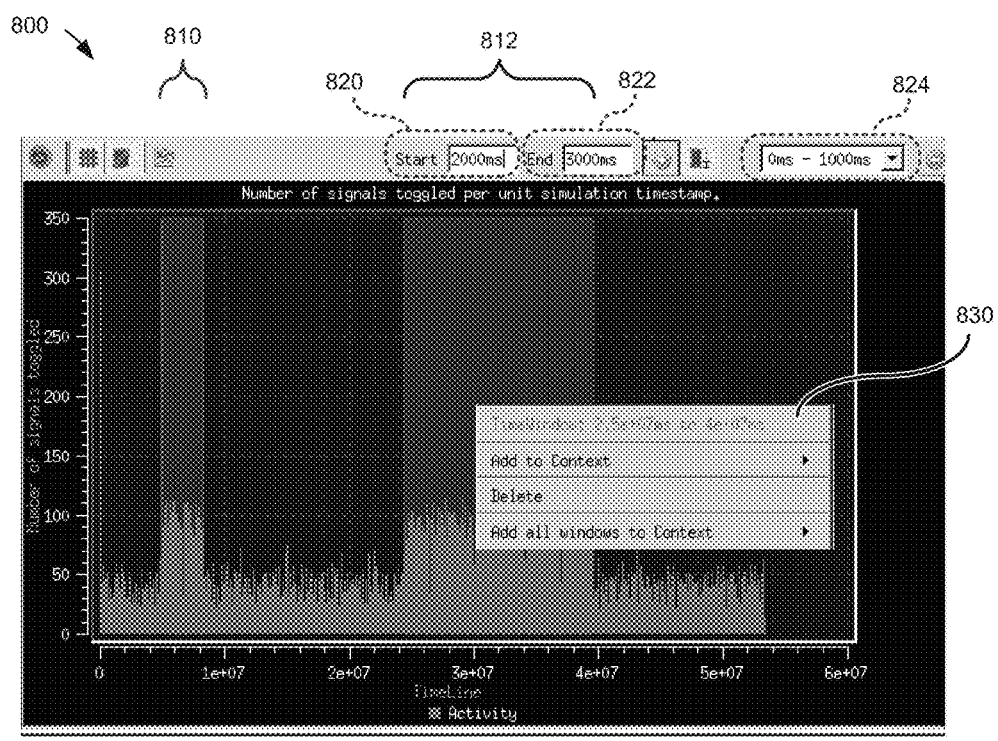
FIG. 8 is an exemplary signal activity editor for a "when" context creator.

The user interface 700 of the context manager can also allow a user to access an activity profiler for selecting a signal and a time period for purposes of generating a "when" context. FIG. 8 shows an exemplary activity profiler 800 that shows the number of signals toggled per unit of time during a simulation. According to the illustrated implementation, a time window can be selected (e.g., by clicking-and-dragging a cursor over a desired period, or by inputting a specific time period in a time period selection fields). Such selection procedures can be repeated as desired. In the illustrated implementation, two time windows 810, 812 are displayed as having been selected. The selected time-windows can be added as a "when" context (e.g., by selecting to add the displayed time periods using a drop-down menu 830 as shown in FIG. 8).

In general, the activity profiler 800 gives a plot between a simulation timeline and the number of signals toggled per simulation timestamp. The activity profiler 800 presents this information in a manner that makes it easy for the user to identify a time window when the chip is highly active. In the illustrated implementation, adding multiple time windows to a "when" context is allowed. Furthermore, in the illustrated implementation, a user can specify multiple start-end pairs manually using start field 820 and end field 822, or can select from among predefined ranges in a selection window 824. Each specified time window will be added to a "when" context and is also listed in the drop-down menu 830. In one implementation, and if required, a user can delete a time window from the "when" context using the drop-down menu 830.

2. Creating Exemplary "Where" Contexts

This section describes exemplary processes for creating a "where" context using embodiments of the disclosed technology. The disclosed processes should not be construed as limiting, as a "where" context can be generated using a variety of techniques. In one exemplary embodiment, the power query interface graphic user interface (e.g., user interface 600) offers one or more ways of creating a "where" context. For instance, one or more of the following context creation mechanism can be used: (1) a "where" context creator accessible from the power query interface user interface; (2) a schematic method, such as a design netlist connectivity layout editor; and/or (3) a source code or HDL browser. Additional details concerning these possible mechanisms are provided below.

a. An Example "Where" Context Creator Implementation

In one example implementation, a "where" context creator is available for use through the power query interface user interface. The "where" context creator can provide flexibility for specifying a "where" context by logically combining (e.g., using a Boolean AND or OR operation) criteria with each other.

Figure 9:
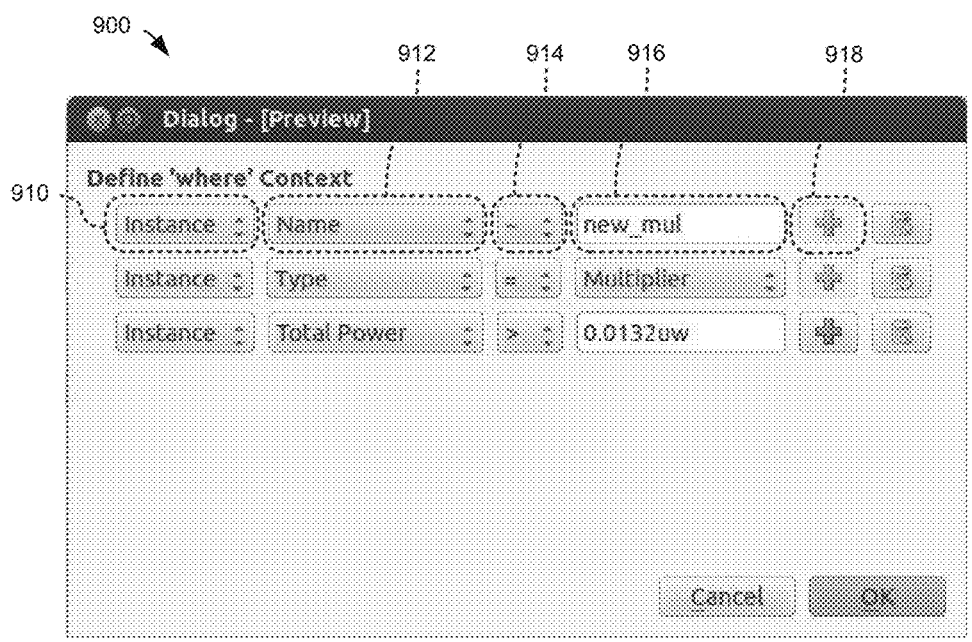
FIG. 9 is an exemplary editor for a "where" context creator.

One exemplary interface 900 for a "where" context creator is shown in FIG. 9. Using the interface 900, a user can specify one or more criteria for identifying the desired components and can additionally logically combine the criteria with one other. In the illustrated embodiment, the interface 900 includes an object field 910 for selecting the type of object that will form part of the criteria and an attribute field 912 for selecting from among multiple attributes of the selected object (e.g., name, type, total power, etc.). The objects and attributes can be any one or more of the objects and attributes shown in Table 1 below. The interface 900 also includes a relational selector 914 for designating a relationship of the selected attributes to an attribute value that can be input in the field 916 (e.g., equals, greater than, less than, does not equal, approximates, and other such relationships). Depending on the selected attribute, the attribute value field 916 can be customized or can include selections from a drop down menu. Together, the information specified in the fields 910, 912, 914, 916 form a criterion that form part of the "where" context.

The interface 900 illustrated in FIG. 9 further includes a Boolean selector 918 for selecting a Boolean operator (e.g., an AND or an OR Boolean operator) to join a specified criterion with one or more additional criteria, thereby forming a more complex "where" context. For the user's ease, auto-completion of signal names can be provided (e.g., when the user starts typing a name in the text field it suggests the full name of the signal based on precedence).

In the example illustrated in FIG. 9, a "where" context is created which points to all those multipliers which have the string "new_mul" in their name and consumes power greater than "0.0132".

b. An Example Schematic Layout Implementation

Figure 10:
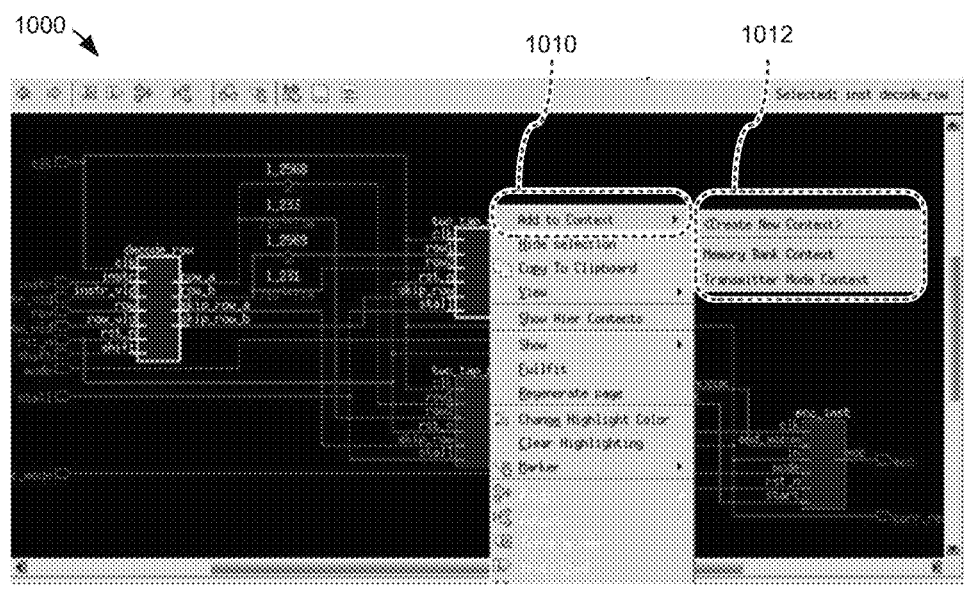
FIG. 10 shows one example schematic editor for use with a "where" context creator that displays a schematic diagram of a circuit and allows the user select one or more circuit components.

In one example implementation, a schematic window for creating a "where" context is available for use through the PQI user interface. For instance, in one embodiment, the user may select to open a schematic editor that displays a schematic view of the circuit or circuit portion and that can be used to select objects to be included in the "where" context. FIG. 10 shows one example schematic editor 1000 that displays a schematic diagram of a circuit and allows the user select one or more circuit components. Within the schematic editor 1000, the user can open a menu that includes an option to "add to context" (as shown, for example, at 1010). The menu can be opened, for example, by the user right-clicking their mouse or providing some other input. The "add to context" feature can also cause a sub-window (e.g., window 1012) to appear that displays all available contexts to which the selected components can be included and/or that allows a user to create a new context.

c. An Example Source Code Browser Implementation

Figure 11:
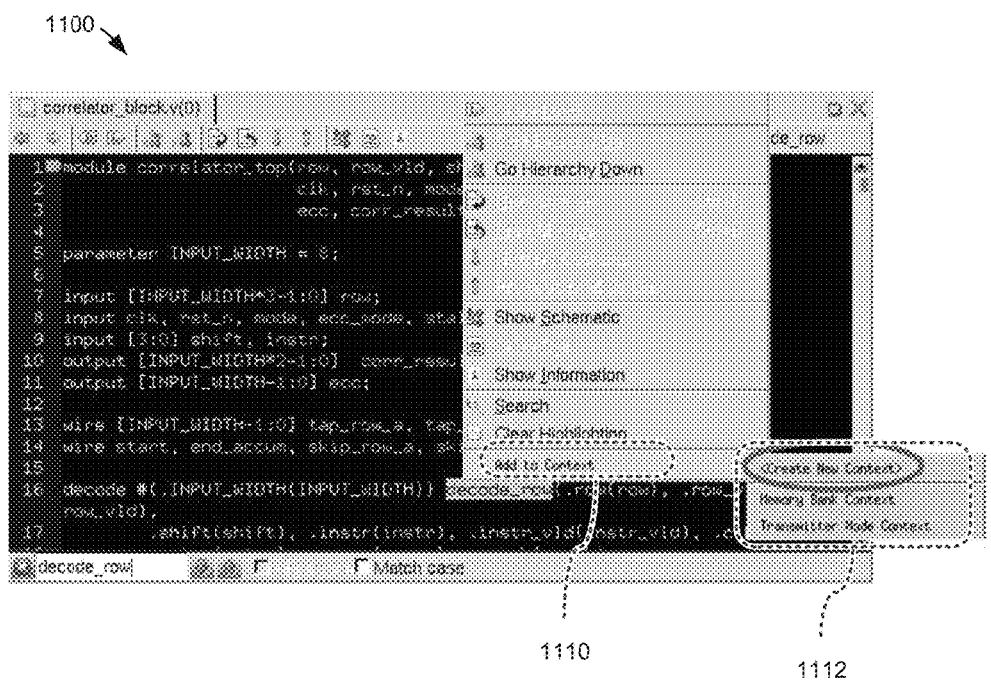
FIG. 11 shows one example source code browser for use with a "where" context creator that allows for selecting components from a source code or HDL description of the circuit or circuit portion.

In one example implementation, a source code browser for creating a "where" context is available through the PQI user interface. The source code browser can be, for example, an RTL editor or other HDL editor that allows a user to select one or more components in the RTL code. FIG. 11 shows one example source code browser 1100 for selecting components from a source code or HDL description of the circuit or circuit portion. In the illustrated embodiment, once one or more components have been selected, the user can open a menu that includes an option to "add to context" (as shown, for example, at 1110). The drop-down menu can be opened, for example, by the user right-clicking their mouse or providing some other input. The "add to context" feature can also cause a sub-window (e.g., window 1112) to appear that displays all available contexts to which the selected components can be included and/or that allows a user to create a new context.

3. Creating Exemplary "What-If" Contexts

In one example implementation, a "what-if" context creator is available for use through the PQI user interface. The "what-if" context creator can provide the flexibility of specifying a "what-if" context (a context that specifies the inclusion of one or more circuit components not currently in the design) by selecting design signals (e.g., using find and/or drag and drop operations) to create a skeleton for the replacement what-if hierarchy. In certain implementations, the selected signals are automatically connected with the input ports of the skeleton hierarchy. Further, in particular implementations, a user can change an input signal into an output signal just by dragging a port on the skeleton hierarchy from one end to the other.

Figure 12:
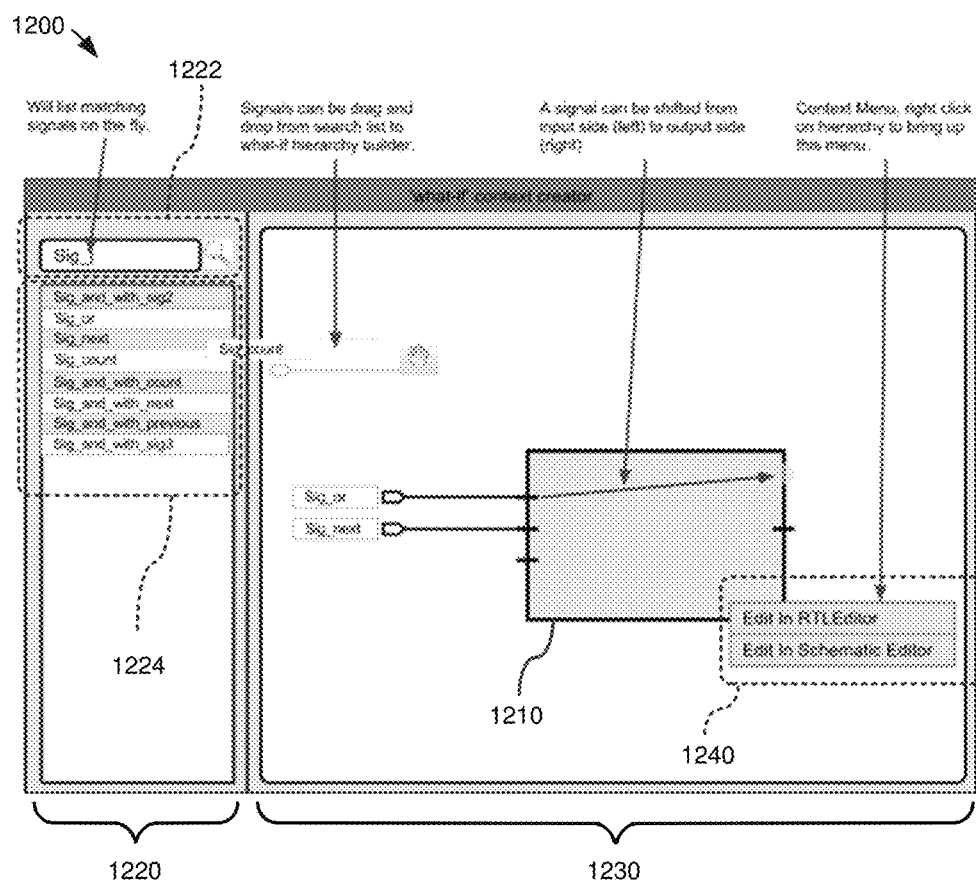
FIG. 12 is an exemplary interface for a "what-if" context creator.

One exemplary interface 1200 for a "what-if" context creator is shown in FIG. 12. Using the interface 1200, a user can quickly find, add, delete, and/or modify the signals input into and output from a skeleton 1210, which, in the illustrated embodiment, comprises a graphical representation of the one or more new components to the design to be considered as part of a power analysis query. For instance, the interface 1200 includes a signal searching region 1220 where a user can input a signal name into a signal name field 1222 and cause matching signals to appear in a matching results window 1224. In the illustrated implementation, the results can appear as the user is inputting the signal name. The illustrated interface 1200 also includes an editing region 1230 that displays the skeleton 1210 and shows the signals that have been added to the skeleton as well as how those signals are processed and output from the skeleton. For example, the user can select one or more processing functions (e.g., add, subtract, multiply, divide, AND, OR, NOR, XOR, XNOR, and combinations thereof) and drop them into the skeleton. The user can then combine the input signals with the selected processing functions in the desired fashion. In the illustrated implementation, the editing region 1230 allows the user to select signals simply by dragging a signal from the results window 1224 into the editing region 1230.

Further, in the illustrated implementation, a user can specify new functionality for the hierarchy either by an RTL editor (or other HDL editor) or a schematic editor. To select either editor, a context menu 1240 can be opened (e.g., by right clicking or providing some other input) and the desired editor selected.

Figure 13:
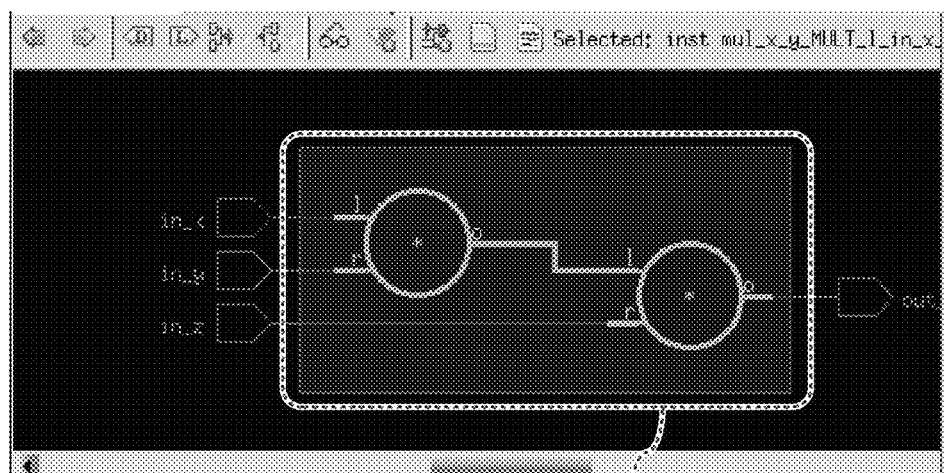
FIG. 13 shows an example schematic editor that can be used to implement the "what-if" context creator shown in FIG. 12

FIG. 13 shows an example schematic editor 1300 that can be used to implement the "what-if" context creator shown in FIG. 12. In particular, the schematic editor 1300 shows a schematic diagram of a circuit block and allows the user to select any one or more signals or logic functions in the schematic. For instance, in the illustrated schematic editor 1300, a rectangle drawn by the user creates a selection region 1310. In certain implementations, the signals coming into the selection region 1310 will become inputs to the what-if skeleton hierarchy, the signals leaving the selection region will become outputs to the what-if skeleton hierarchy, and the logic in the selected region will be placed in the new skeleton hierarchy as the processing function of the skeleton.

Figure 14:
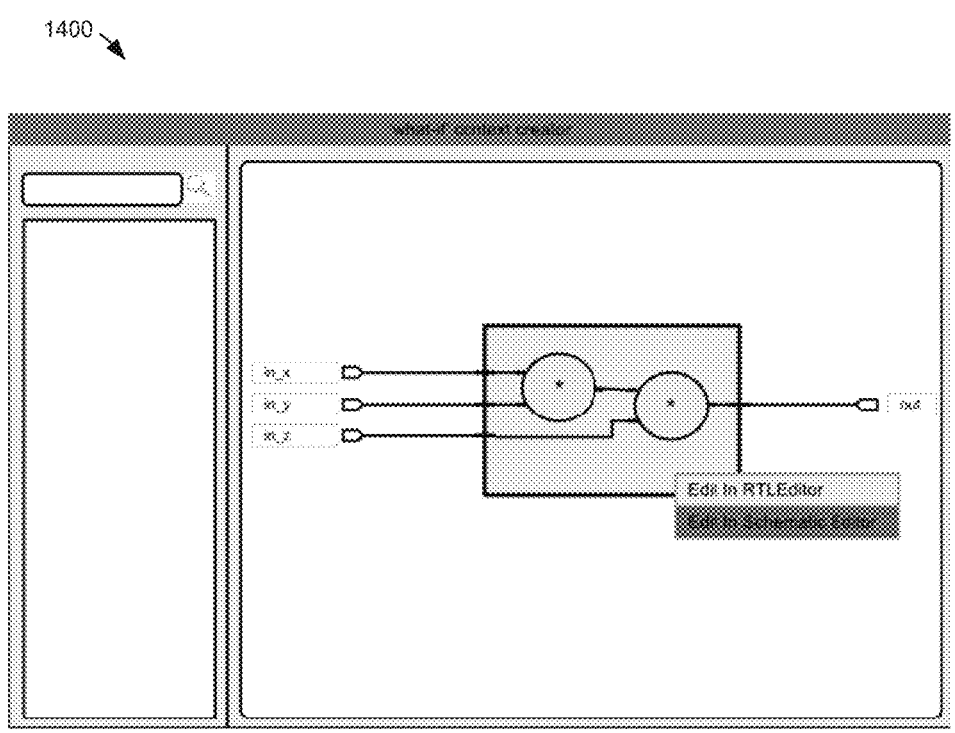
FIG. 14 shows an exemplary "what-if" context creator after having been updated with the region selected in FIG. 13.

FIG. 14 shows a "what-if" context creator 1400 after having been updated with the region selected in FIG. 13. As can be seen, the selected input signals, output signals, and functions are imported into the hierarchy. To modify any of the signals or the functions, either the "what-if" context creator or the schematic editor can be used (e.g., by selecting the new signals or functions from a window and dragging and dropping them into the body of the hierarchy). In certain implementations, the functionality can only be modified from one of the schematic editor or the "what-if" context creator. In still further embodiments, the functions of the schematic editor are integrated into the "what-if" context creator so that the editor is not treated as a separate module. In still further embodiments, the user can alternatively choose to edit the hierarchy using a suitable HDL editor (e.g., an RTL editor). For example, in one particular implementation, an RTL editor can be used to specify Verilog equivalent module definitions for the hierarchy.

C. General Examples of the Disclosed Technology

Having described exemplary implementations of the disclosed PQI technology, this section discloses examples of generalized methods for performing aspects of the disclosed technology. The particular methods described in this section should not be construed as limiting, as the scope of the disclosed technology extends to all novel and nonobvious features disclosed herein, individually and in any combination with one another. The generalized methods disclosed below can be performed using computing hardware (e.g., a computer processor or an integrated circuit). For instance, the methods can be performed by computing hardware such as shown in FIG. 1. Furthermore, the generalized methods disclosed below can also be implemented as computer-executable instructions stored on one or more computer-readable storage media (e.g., tangible non-transitory computer-readable storage media).

Figure 25:
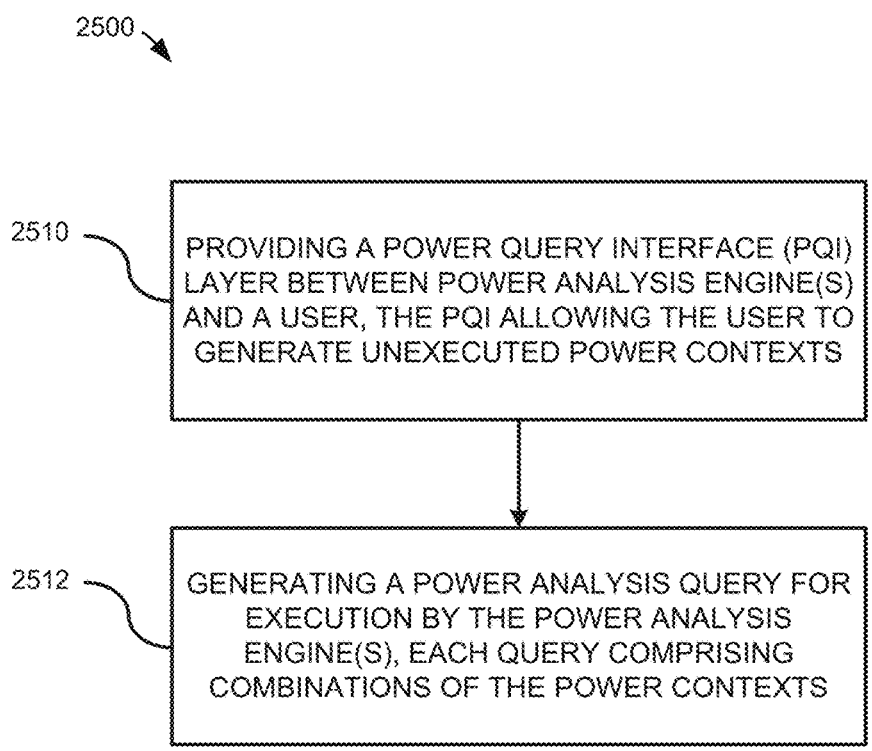
FIG. 25 is a flowchart of an exemplary method by which a PQI layer as disclosed herein can be used to improve the power analysis of a circuit design.

FIG. 25 is a flowchart of an exemplary method 2500 by which a power query interface layer as disclosed herein can be used to improve the power analysis of a circuit design.

At 2510, a power query interface layer is provided between one or more power analysis engines and a user. In the illustrated embodiment, the power query interface layer allows for the user to generate one or more unexecuted power contexts for analyzing at least a portion of a circuit design.

At 2512, a power analysis query is generated for execution by the one or more power analysis engines. In the illustrated embodiment, the power analysis queries each comprise combinations of the unexecuted power contexts.

In certain implementations, the unexecuted power contexts comprise one or more of: (a) a power context specifying a power mode or time of interest for the at least a portion of a circuit design; (b) a power context for specific components in the at least a portion of the circuit design; or (c) a power context for one or more new components not currently in the at least a portion of the circuit design. In some implementations, the power query interface layer comprises a context database for storing the one or more unexecuted power contexts. In certain implementations, the unexecuted power contexts comprise a power context that specifies one or more new components not currently in the circuit design (e.g., a "what-if" context) and that, when executed, causes a modification to a netlist for the at least a portion of the circuit design. In such implementations, the power query interface layer can comprise a database for storing the netlist before modification and for facilitating restoration of the netlist to the state before modification if the one or more new components are rejected by the user. In some implementations, the power query interface layer further comprises a simulation database for storing results from previously executed power analysis queries and for facilitating use of the results in subsequent power analysis queries.

Figure 26:
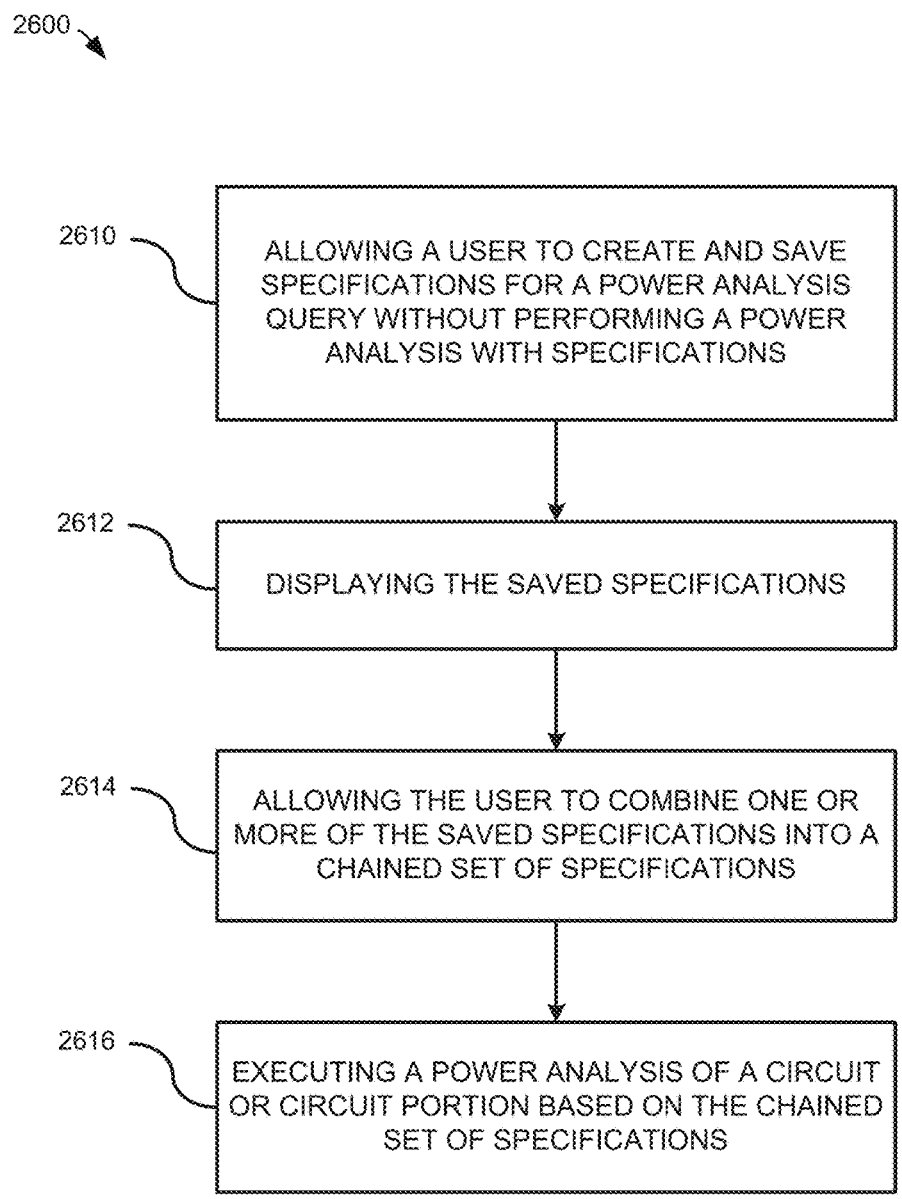
FIG. 26 is a flowchart of an exemplary method by which a PQI can operate

FIG. 26 is a flowchart of an exemplary method 2600 by which a power query interface can operate. For example, the method 2600 can be implemented by the graphic user interfaces and associated editors described above.

At 2610, a user is allowed to create and save a plurality of specifications for a power analysis query without performing a power analysis based on any of the specifications. In the illustrated embodiment, each of the specifications defines a set of constraints to be used during a power analysis of a circuit design or a portion of the circuit design. For example, the specification can be any of the power contexts described herein (e.g., a "where" context, "when" context, "what-if" context, "powerspec" context, or other such context).

At 2612, the saved specifications are displayed to the user (e.g., as in user interface 600).

At 2614, the user is allowed to combine one or more of the saved specifications with each other to form a chained set of specifications. For instance, the user interface can include a mechanism that allows the user to easily select and combine one or more of the saved specifications (e.g., via the drag-and-drop region 618 in FIG. 6).

At 2616, a power analysis of the circuit design or the portion of the circuit design is executed based on the chained set of specifications. For example, from the specified chained set of specifications, the PQI can generate an appropriate power query analysis (command) for causing the one or more power engine(s) to perform a power analysis.

In certain implementations, the specifications for the power analysis query include a specification of a power mode or time of interest for the circuit design or the portion of the circuit design (e.g., a "when" context). In such implementations, the method can further comprise allowing the user to select the specification of the power mode or time of interest via an RTL editor, an activity profiler, or an editor that allows the user to specify a set of signal conditions joined by one or more Boolean operators. In some implementations, the specifications for the power analysis query include a specification for a spatial region in the circuit design or the portion of the circuit design (e.g., a "where" context). In such implementations, the method can further comprise allowing the user to select the specification for the spatial region via a schematic layout editor, an RTL editor, or an editor that allows the user to identify target components joined by one or more Boolean operators. In certain implementations, the specifications for the power analysis query include a specification for one or more potential components not currently in the circuit design (e.g., a "what-if" context). In such implementations, the method can further comprise allowing the user to select the specification for the one or more potential components not currently in the circuit design via an editor that allows the user to search for design signals and construct a graphical representation of the one or more potential components and/or allowing the user to select the specification for the one or more potential components not currently in the circuit design via an RTL editor. In some implementations, the act of executing the power analysis of the circuit design or the portion of the circuit design based on the chained set of specifications comprises performing a power analysis for one or more potential components not currently in the circuit design (e.g., executing a "what-if" context). In such implementations, a netlist for the design can be modified and the power analysis can be performed on the modified netlist. In such implementations, the pre-modification netlist can be stored so that it can be restored if the design changes are rejected by the user. In certain implementations, the specifications of a power analysis query include a specification of electrical power intent, such as that supplied by a UPF/CPF file or special commands, to indicate a variation of characteristics such as operating voltage. In such implementations, the method can further comprise allowing the user to select the specification of the electrical power intent via an editor specialized for UPF/CPF or another such format.

Figure 27:
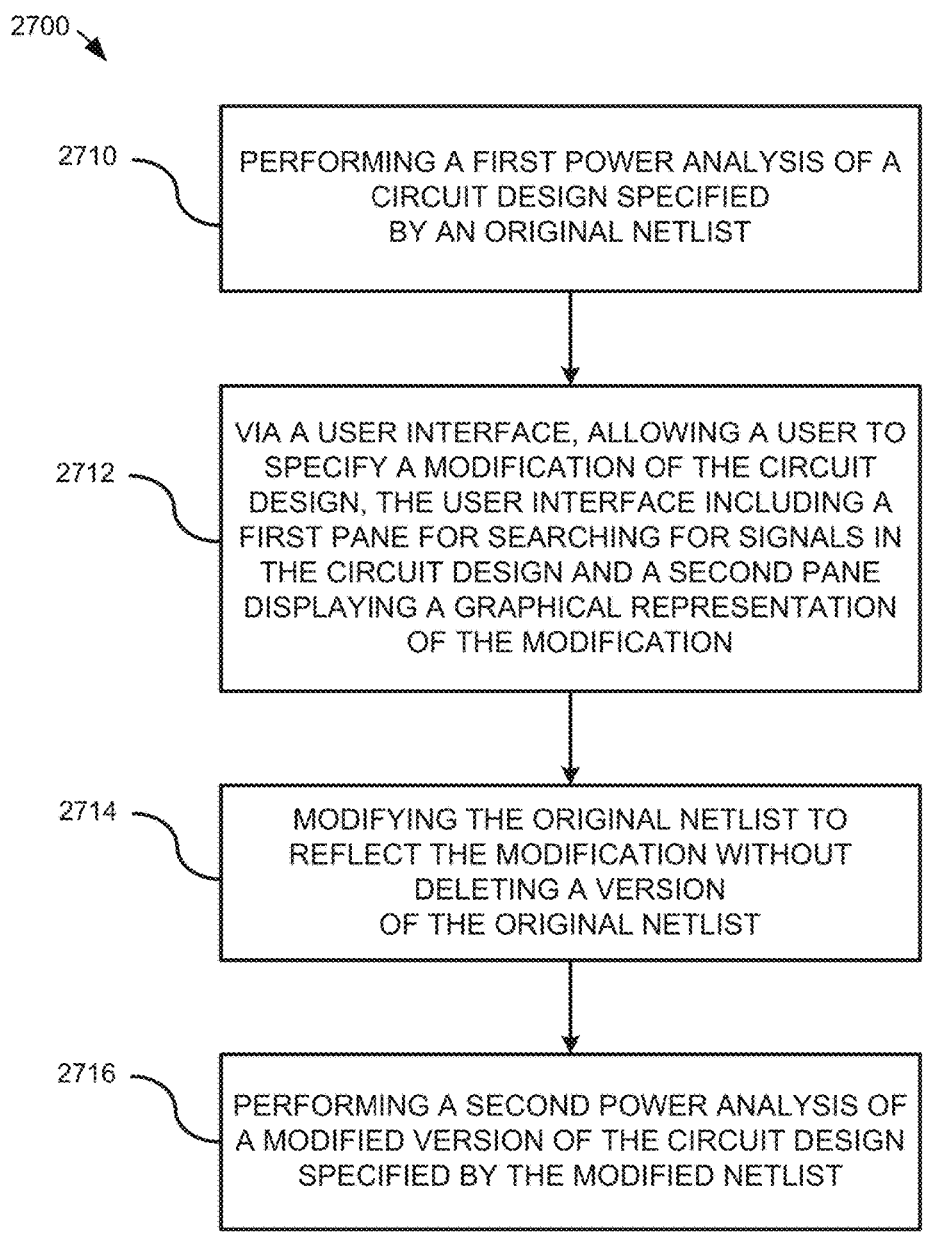
FIG. 27 is a flowchart of another exemplary method by which a PQI can operate.

FIG. 27 is a flowchart of an exemplary method 2700 by which a power query interface can operate. For example, the method 2700 can be implemented by the graphic user interfaces and associated editors described above.

At 2710, a first power analysis of a circuit design specified by an original netlist is performed.

At 2712, a user is allowed to specify a modification of the circuit design (e.g., using graphic user interfaces, such as the user interfaces in FIGS. 12-14). In particular implementations, the user interface includes a first pane allowing the user to search for signals in the circuit design and a second pane displaying a graphical representation of the modification to the circuit design (e.g., as in the user interface in FIG. 12).

At 2714, the original netlist is modified to reflect the modification to the circuit design. In the illustrated embodiment, the modification is performed without deleting a version of the original netlist.

At 2716, a second power analysis of a modified version of the circuit design specified by the modified netlist.

In certain implementations, the method further comprises restoring the original netlist using the saved version of the original netlist.

D. Implementation Details for Embodiments of the Disclosed Power Query Interface Technology As noted above, embodiments of the disclosed technology allow for new contexts to be defined in terms of one or more "when" contexts (which capture a temporal context), "where" contexts (which capture a spatial context), "powerspec" contexts (which capture electrical power intent contexts), and "what-if" contexts (which capture hypothetical design changes different from the current design). In certain embodiments, the disclosed technology provides power query interface layer comprising a power analysis query infrastructure that allows for any of these contexts to be combined with one another, thereby enabling more robust, complex, and useful power analysis queries. Furthermore, the power contexts can be created through the use of any of the disclosed user interfaces, which provide an efficient and user-friendly mechanism for allowing a user to create a wide variety of power contexts.

1. Example Syntaxes

The particular syntaxes and infrastructures disclosed in this section should not be construed as limiting, as the features and flexibility of the disclosed implementation can be achieved using variations of the disclosed infrastructure that would be attainable by those skilled in the art.

According to one exemplary implementation, the following command syntax is used to create a new context:

new_context [-when <expression capturing temporal context>] [-where <expression capturing the spatial context>|-what_if<expression capturing what-if context>]-name <context_name>|-powerspec<name of a complete or partial UPF/CPF file>]

In general, and according to certain embodiments of the disclosed technology, a context is created when the new_context command is invoked, but the query represented by the new context would be executed only when a power analysis command is executed with respect to it. This characteristic of the new_context statement allows for the efficient chaining of context. Further, embodiments of the user interfaces introduced in the previous section can be used to determine the content of the contexts in the new_context and be used to generate the new_context command (e.g., by generating individual context or by combining one or more of the contexts). In certain implementations, any one or more contexts can be referred to by name in subsequent power analysis queries or new_context specifications.

2. Example Syntax Rules for "When", "Where", "What IF", and "Powerspec" Contexts Example implementation details concerning the "when", "where", "what_if" and "powerspec" contexts are described in the following paragraphs. It should be understood that the described features and functions are by way of example only, and do not limit the scope of the invention.

In one example implementation, the "when" context is used to define a new scope of activity information. The expression that is used to capture a temporal context can be, for example, a Verilog combinational logic expression comprising: (i) hierarchical signal names from the design; (ii) context names (the reference to contexts allows one to chain context creations); and/or hierarchical names of signals within contexts (when the contexts are "what-if" contexts). For example, one can compute a new simulation context (e.g., defined by timestamps) by evaluating the expression over the existing context. If a context name, say c, is used as a support of the expression, the support is a single bit signal that is "true" for each timestamp within the simulation context of c. The expression may also be supported by signal names with reference to a context (e.g., like c1.sig). The interpretation is that the signal will be taken from the context c1 (if c1 is a what-if constant). Furthermore, if there are sequential elements in the fan-in of the "when" expression due to "what-if" contexts, dynamic simulation can be used to evaluate the query (otherwise, mining should be sufficient)

In one example implementation, the "where" context is used to get a new scope of logic to analyze. The expression that is used to capture a temporal context can be either of the following: (i) a tcl list of netlist-objects (the tcl list allows one to get the scope for analysis by any tcl pre-processing tool or by using a "find" command) or (ii) a Boolean expression comprising context names (such as "c1 & c2"); this implies that a new spatial context is created by combining the input contexts as specified by the Boolean operators (e.g., using standard set intersection, union, and complement notions). In particular implementations, the "where" context and "what-if" context are mutually exclusive options. This applies recursively, so any context specified with "what-if" may not be used in a context with "where" and vice-versa.

In one example implementation, the "what-if" context is used to specify attachment or replacement spatial contexts for a pre-existing spatial context. Further, multiple "what-if" clauses may be specified within the same new_context statement. Additionally, a "what-if" context can import pre-existing earlier "what-if" contexts as, for example, "-what_if [c1 c2 cn]" where a list of pre-specified (and non-conflicting) "what-if" contexts are provided. The interpretation of such a context is a union of the pre-specified "what-if" contexts. The spatial context of a new_context statement with a "what-if" context is automatically set to the attachment or replacement logic specified by the transactor(s) associated with the context.

In one example implementation, the "powerspec" context is used to specify the electrical power intent for a pre-existing spatial context. The electrical power intent may be specified within a file that has UPF or CPF commands (but not both). The spatial context to which the "powerspec" context is associated may be either one that exists in the design or a "what-if" context. The interpretation of such a specification within a power analysis query would be to apply the operating conditions such as voltage etc. specified within the UPF file to the spatial context.

The chaining of contexts allows this infrastructure to be very flexible and dynamic. Furthermore, the syntactical structure can be tailored to the usability requirements of power analysis, as in the examples discussed above.

3. Iteration

Certain embodiments of the disclosed technology have the ability to iterate over the elements of a context. For instance, the syntax to perform such iterations according to one exemplary implementation is provided by:

context_iterator -context <context_name>[-signal_handler<proc_to_handle_signals>|-port_handler<proc_to_handleports>|-instance_handler<proc_to_handle_instances |-module_handler<proc_to_handle_modules>|-timestamp_handler<proc_to_handle_timestamps>]

4. General Keywords for Creating Contexts

While the previous sub-sections introduced arbitrary "when" (temporal), "where" (spatial), "what-if" (hypothetical design change) and "powerspec" (hypothetical electrical power intent) contexts based on any attributes that a power analysis tool can return, it is desirable for some embodiments to have specific objects and attributes that can be specified in a context. For example, in one particular implementation, one or more of the attributes shown in Table 1 comprise possible objects and attributes for use as part of the specification of a context:

In one example implementation, the following definitions are provided:
 object_keyword: keywords in a first column of a keywords table (as shown, for example, in Table 1).
 attribute_keyword: keywords in a first row of a keywords table (as shown, for example, in Table 1).
 whencontext: a context created with the -when option only.
 wherecontext: a context created with the -where option only.
 what-ifcontext: a context created with the -what-if option only.
 powerspeccontext: a context created with the -powerspec option only.
 homogeneouscontext: a context created with a combination of other contexts of the same type. For example: create_context -name C3 -where "C1 & C2" (e.g., where C1 and C2 are "where" contexts)
 heterogeneouscontext: a context created with a combination of "where", "what-if", and "when" contexts. For example: create_context -name -where C3—when C4.
 pqi-reference: a reference used in the creation of contexts, specifically while defining an expression for the context. This could be any one or more of the following:
  context_name_reference: a predefined context name (e.g., a context which is already created). The reference to contexts allows embodiments of the disclosed power query analysis tool to chain context creations.
  context_object_reference: an object or a group of objects in a specific context (e.g., by a combination of object_keyword and atribute_keyword). For example, consider DC.port.td, C1.instance.port. In this example, DC is a default context and C1 is a user-created context which is already executed before getting reused in this context. If it is not executed, then it is desirably executed before the context which is using it as reference.
 constant value: constant values can include one or more of the following:
  Numeric constants, like 1'b0, 2'b1, 10001, 1'h0, etc;
  Predefined enumerations, like port_type (e.g., Input-Port, OutputPort, PrimPort, HierPort, LowerPort, UpperPort),instance_type (FLOP, HIER, MEM, AND, OR), and signal_type.
  Lists, like hierarchical port/instance/signal names from the design. In certain implementations, an object_keyword is used before any string. For example:
   port:module1_inst.module2_inst.flop1.d,
   instance: {\module1_inst. module1! 2_inst.flop1}
 DC: DC is a context_name_reference which refers to a default context. In the default context, the full netlist is

TABLE 1

Example Keyword Table Showing Objects and Associated Attributes

| | Name | type | prob | Td | dyn_power | lk_power | port | delay | slack | width | start | end |
|---|---|---|---|---|---|---|---|---|---|---|---|---|
| Signal | Yes | Yes | Yes | Yes | Yes | Yes | | Yes | Yes | Yes | | |
| Port | Yes | Yes | Yes | Yes | | | | Yes | Yes | Yes | | |
| Instance | Yes | Yes | | | Yes | Yes | Yes | Yes | Yes | Yes | | |
| Module | Yes | | | | | | Yes | | | | | |
| Time Stamp | | | | | | | | | | | Yes | Yes |

In particular, the rows of Table 1 show objects of a circuit design while the columns show the possible attributes that may exist for the associated object (as indicated by a "yes" in the corresponding table cell).

available to be referred by object_keyword, and all attribute values (like lk_power, td, prob, etc.) are available to be referred by attribute_keyword by default and without user action.

report_power: report_power is the power reporting command that the power analysis tool has. This command is a type of power analysis query and is used to invoke the one or more power analysis engines for the designated context and to compute a result.

get_sa: get_sa is the activity reporting command that the power analysis tool has for generating an activity report. This command is a type of power analysis query and is used to invoke the one or more activity analysis engines for the designated context and to produce a report. Typically, the command produces a report showing the toggle density and probability pairs.

SA: Simulation Activity captured from simulation dumps VCD/FSDB/GAF.

5. Example User Interface Commands

An example command for creating a context is as follows (where, in the illustrated implementation, -where and -what_if are mutually exclusive options):

create_context[-when <expression capturing temporal context>] [-where <expression capturing the spatial context>|-what_if<expression capturing what-if context>][-powerspec<filename of electrical power intent specification>] -name <context_name>

An example command for iterating over the elements of a context is as follows (where, in the illustrated implementation, more than one handler could be specified):

context_iterator-context <context_name>[-timestamp_handler <proc_to_handle_timestamps>|-signal_handler<sh>|-port_handler<ph>|-instance_handler<ih>|]

An example usage of these commands is as follows:
create_context -name active_mode -when {(mode_Sig1==1?b0) & (control_sig_x !=1?b0)}
  -where {DC.inst.dyn_power>1mw}
report_power -context active_mode The above set of commands will report power for all those instances whose power is greater than specified threshold (in this example, 1 mW) under the specified mode of operation, where the mode is specified as a Boolean expression.

6. PQI Commands Parsing: Creating of Contexts

In certain implementations of the disclosed technology, a context is created and evaluated when new_context is invoked, but the query represented by the new context is executed only when a context is applied with a power analysis query (also referred to as a power analysis command), such as the report_power or get_sa commands. Because a "context" is a power analysis tool representation that is not executed until it is invoked by a power analysis command, the "context" representation offers a powerful mechanism for creating complex, highly useful power analysis queries. For example, because contexts can exist without executing a power analysis, they can be efficiently chained together and used to create a robust set of power analysis queries. Additionally, and as more fully disclosed above, embodiments of the disclosed technology include user interface tools that provide a flexible and user-friendly means for creating, managing, and using contexts for power analysis.

In particular implementations, the following sets of example rules are used for creating, iterating, and/or executing contexts.

a. Example Generic Rules a context name is before an object_keyword.
an object_keyword is before an attribute_keyword.

A context can be created using pqi-reference(s) and logical operators.

A context is created and evaluated right away when the command new_context is invoked.

A context is queried and executed when it is applied (a context is applied due to some apply_context_command which needs it to compute the final results).

A predefined context may be referred to by name in subsequent new_context specifications.

A heterogeneous context can only be referred in another context if it is already executed (e.g., results are stored for it in the context database).

A referred context is not queried and executed while evaluating the parent context.

A referred context is executed (if results are not found in the context database) before executing the parent context (or it is an error).

The command context_iterator iterates over results of executed context and respective callbacks are called for each result list.

When a "what-if" context is used with command context_iterator, the "what-if" context will do a design database traversal on a linked transactor(s) and will invoke the registered callback for each element with the context name as prefix scope (e.g., {C1.transactor1.in1 C1.transactor1.in2, C1.transactor1.node, C1.transactor1.out, C2.t1.in, C2. t2. in . . . )

b. Example Rules for a "When" Context

A pqi_reference(s) of type context_name_reference and constant_value can only be used in expression (e.g., context_object_reference cannot be used).

Only those context_name_reference which are of type when-context, are allowed.

If the constant_value is of type string (e.g., neither a numeric constant nor predefined-enum), only signal object keyword is allowed.

c. Example Rules for a "Where" Context

Any type of pqi_reference(s) can be used to define the expression.

Only those context_name_reference which are of type where-context, can be used in expression.

d. Example Rules for a "What-If" Context what-if-context can only be created with 'transactor or other expression of predefined what-if context_name_referance.

No other pqi-reference is allowed in expression.
Expression can only have '&' (union) operator
The transactor, used in creation of any what-if-context, must already be created/sourced by the tool.

e. Example Rules for a "Powerspec" Context powerspec-context can point to a UPF/CPF file using predefined keyword.

There are other keywords that may also be used to set various other power related properties directly without specifying CPF/UPF file.

In case CPF/UPF file is specified along with direct power property keywords, value(s) specified with keyword(s) will take the precedence.

f. Example Rules for a Homogeneous Context

A context would only be named as homogeneous until it has a context_name_reference. Hence, a homogeneous context should be named as either a "where", "when", or "what-if"context after evaluation.

g. Example Rules for a Heterogeneous Context

For a heterogeneous-context, if it has a what-if_expression_tree or a where_expression_tree, it will be executed first.

7. Example Context Results

In certain implementations, a context, after being executed by one or more power analysis engines using a power analysis query, produces a result. The result from executing the context can be one or more lists (e.g., a list of lists), where, the lists are of type object_keyword(as shown, for example, in the first column of Table 1 above). Example results from executing a created context are shown below:

Example 1: create_context -name C1 -where {DC.instance.type==FLOP}
Example 1 result: {signal { } port { } instance {a.bff1 a.b.fF2 a.ff1}module { }timestamp { }}
Example 2: create_context -name C2 -where {DC.port.td>0.00001}
Example 2 result: {signal { } port {x.y.z aff1.d aff1.q a.b.c} instance { }module { }timesta . . . }
Example 3: create_context -name C3 -where {C1 & C2}
Example 3 result:{signal { }port {aff1.d aff1.q} instance {a.ff1} module { }timestamp { }}
Example 4: create_context -name C4 -where {C1|C2}
Example 4 result: {signal { } port {x.y.z a.ff1.d a.ff1.q a.b.c} instance {x.y a.ff1 a.b} mod . . . .

It should be noted that, in certain implementations, the value of attributes for each of element in these lists will be computed and cached after execution (e.g., after one or more power analysis engines execute the contexts as part of a power query analysis). If the user has not demanded the attribute value before referring that value in another context, an error will be generated. For example, Example 5: create_context -name C5 -where {C1.instance.lk_power>0.0035}
Example 5 result: error; power not computed for context C1.

It is advised to execute "report_power -context C1" before using power result as a reference in "C5". If the report_power was done for the context C1 then the evaluation result for C5 would be: {signal { } port { } instance {x.y a.ff1 a.b} mod . . .

Example 6: create_context -name C6 -where {C1.port.lk_power>0.0035}
Example 6 result: error; 'port.lk_power' is an invalid keyword.

The above examples and results should not be construed as limiting, as the results can be presented using a variety of different structures and representations. In certain implementations, the structure of the result from the command to create a new context is such that the mathematical set operator can be easily applied to it, thus providing the capability of the context to be combined with other sets.

8. Example Elements of a Context Representation

According to certain example implementations, a context representation uses one or more of the following: context name, raw_expression, when_expression_tree, where_expression_tree, what-if_expression_tree (which can eventually be turned into a list of netlist hierarchies), links to an electrical power specification database instance; and/or results (in particular implementations, results are elements whose specific attribute can be queried (e.g., the columns in Table 1))

9. Evaluating a Context

In certain embodiments, building an expression_tree from a raw_expression(e.g., a tcl list) is referred to herein as context evaluation. A raw_expression may have references to other contexts, but its expression_tree will not. In other words, it can be said that evaluation is turning a homogeneous context into a plain context. In some implementations, a heterogeneous context will have two expression_tree, one for when-context another for either where or what-if context.

a. Evaluating a "When" Context

As stated earlier, a when-context expression may have pqi_reference of type context_name_reference and constant value only where context_name_reference is of type when-context only. In certain embodiments, evaluating a when-context comprises replacing all context_name_reference(if any) with its when_expression_tree. In some implementations, irrespective of the operand type, any operator (e.g., &, I, !, ^, . . . ) specified in a "when" context will eventually became a logical gate, even though the operator is applied on a context_name_reference.

As an illustration, consider the following commands:

```
create_context -name C7 -when
{
    (signal:s1 == 1'b1) | signal:s2 == 1'b0)
                        &
    (signal:s3 == 1'b1)
}
create_context -name C8 -when { signal:s4 == 1'b0 }
create_context -name C9 -when { (!C7 & C8) | (C7 |
    (signal:xyz_inst.s5 == 1'b0)
}
```

Figures 19, 20:
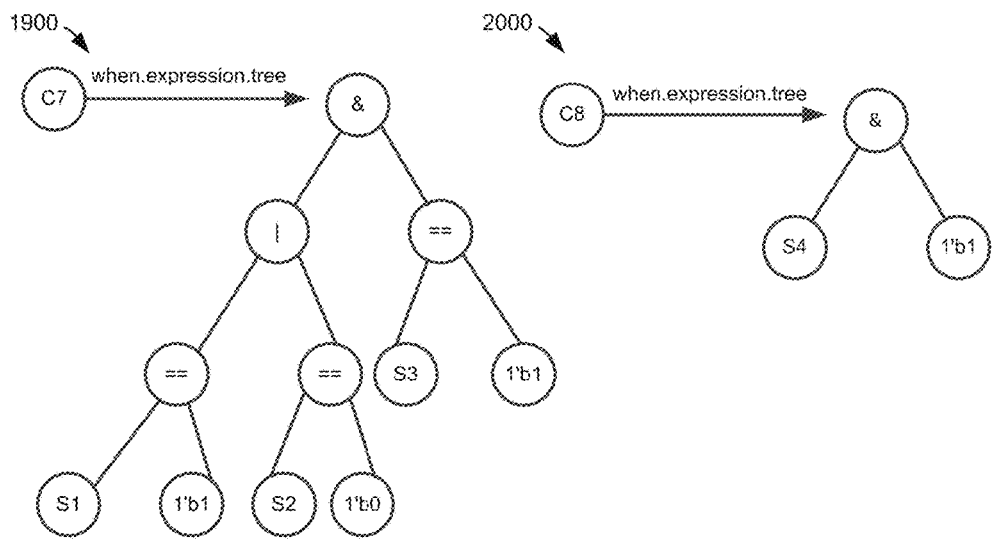
FIGS. 19 and 20 show example expression trees for two example contexts.

For the first two contexts (C7 and C8), representations of trees 1900 and 2000 shown in FIGS. 19 and 20, respectively, will be generated during evaluation. Further, FIG. 21 shows intermediate evaluation tree 2100 for context C9.

Figure 21:
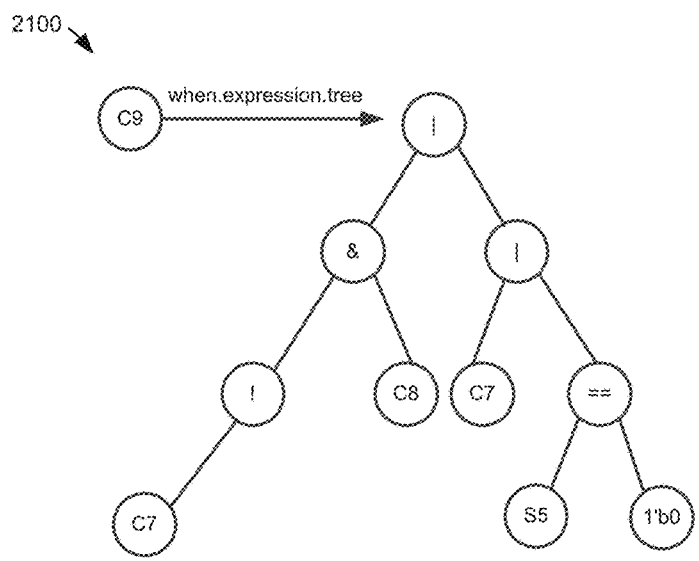
FIG. 21 shows an intermediate evaluation tree for contexts shown in FIGS. 19 and 20.

In order to complete the evaluation process for C9, as shown in FIG. 21, two context_object_references C7 and C8 need to be resolved. To resolve these references, a precomputed when_expression_tree of C7 and C8 will be queried from contexts C7 and C8. If there is a failure to get when_expression_tree for either C7 or C8, an error will be generated.

b. Evaluating a "Where" Context

Figure 22:
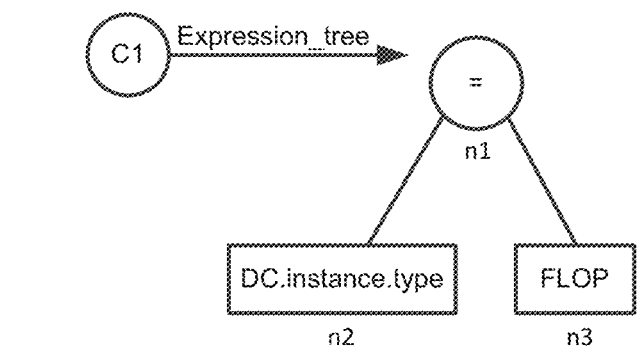
FIGS. 22 and 23 show two further expression trees for two example contexts.
Figure 23:
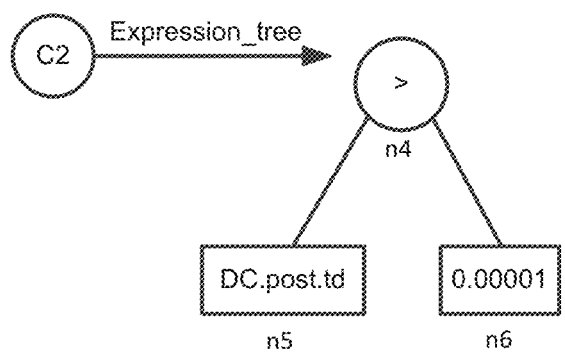
Figure 24:
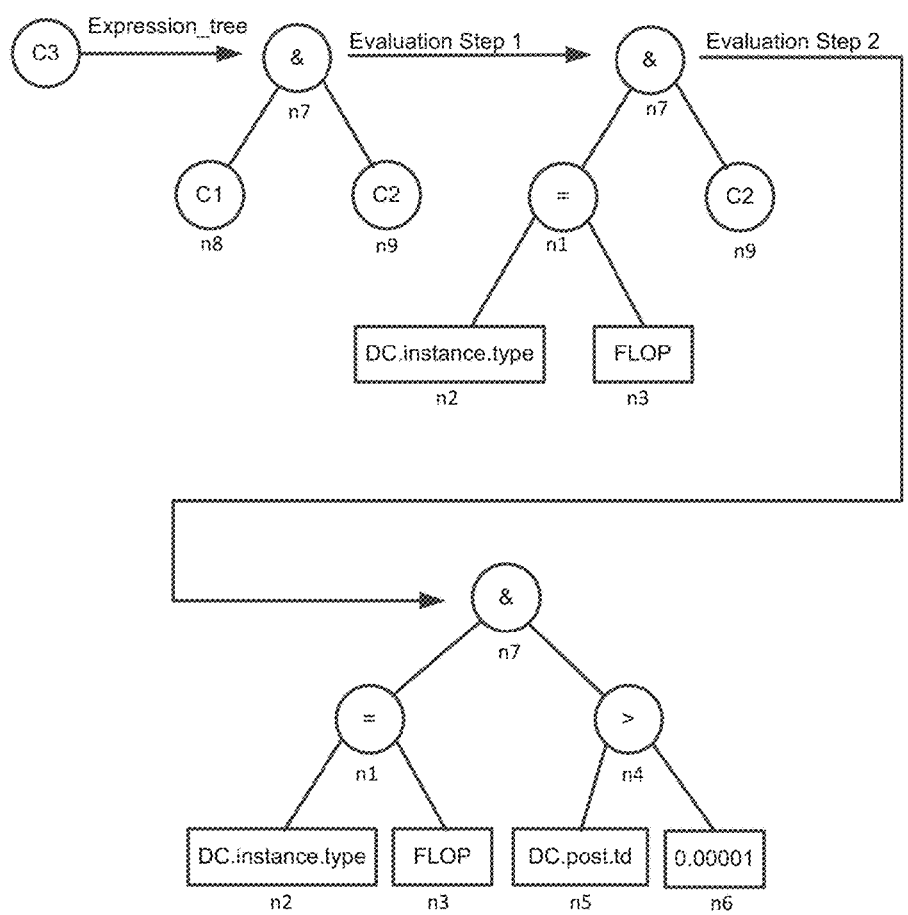
FIG. 24 shows an evaluation tree for the contexts shown in FIGS. 22 and 23.

As stated earlier, the where-context expression may have any pqi_reference and various operators. It should be noted that execution of an operator (for where-context) can depend on the type of pqi_referance. As an illustration, consider the node "n7" in the tree evaluation diagram 2400 in FIG. 24. In FIG. 24, node "n7" is a logical operator that implies that a new spatial context C3 is to be created by combining the input contexts C1 and C2, which are defined in tree diagram 2200 and 2300 shown in FIGS. 22 and 23, respectively. In certain implementations, standard set intersection, union, and difference notions may be applied for &, |, and -). In a fully evaluated where_expression_tree, the leaf level operator represents an atomic operation. This atomic operation is also named as an atomic_query, which can be solved using an atomic query executor (e.g., atomic query executor 512).

c. Evaluating a "What-If" Context

As stated earlier, a what-if-context expression may only have a "&" (set union) operator that is bound to take two operands strictly of type context_name_reference(-what-if context reference only), which implies "what is the effect if both 'netlist changes' are applied together". If the expression does not have an "&" operator, the expression follows the transactor instantiation syntax. The transactor syntax gives the mapping between the old logic with the new logic in terms of design signals.

d. Evaluating a "Powerspec" Context

The evaluation of a powerspec context requires the creation of an electrical power intent database instance which can be queried for electrical characteristics, such as operating voltage. The electrical power intent database instance is created by a utility that can parse and extract relevant information from the UPF/CPF file specified as part of a -powerspec context.

e. Evaluating a Heterogeneous Context

The evaluation of a heterogeneous context can be performed by splitting parts of a heterogeneous-context into two different expression_trees.

10. Executing a Context

In particular embodiments, execution of a context concerns getting information about the objects (e.g., netlist objects or an object just introduced by the user by providing transactor) or signal activity data, where the attributes of those precise objects and activities will be filled and/or computed by the "apply_context_command". The apply_context_command is used to form a power analysis query that is used to execute one or more power analysis engines according to the specifications of the applied contexts.

Moreover, the process of creating floating hierarchies for a what-if-context or computing the signal activity data based on a when-context, or computing target objects for apply_context_commands using a where-context, all relate to context execution.

a. Execution of a Heterogeneous-Context

In the case of a heterogeneous context, if the case has a what-if_expression_tree, it will be executed first. Once floating hierarchies are created for a given what-if context, the when_expression_tree can be executed to annotate the signal activity analysis. In certain situations, the result of this heterogeneous-context creates a replaced section of a netlist. For example, the "what-if" affected portion of netlist will become a where-context result for subsequent apply_context_commands.

b. Execution of a "When" Context

The "when_expression_tree" can be used to build BDD [what is BDD?], as it is desirable to compute the output of this boolean expression for applied input values (for a present timestamp while iterating over fsdb timestamp-wise). The timestamp for which this boolean expression turned out to be true, the timestamp can be recorded as a result. At the same time, and in certain implementations, a when_aware_fsdb2sa engine can only take those timestamps in account to generate a final SAIF.

c. Execution of a "Where" Context

In one exemplary implementation, the where_expression_tree is a construct of "atomic queries", where these queries may get served by evaluating a netlist, by searching a context database, and/or by performing mathematical set operations. Whatever be the "atomic query", it can be served by the atomic query executor, which can produce context results. Upon executing a where-context, its resulting data structure can be populated with pointers to matched netlist objects.

d. Execution of a "What-if" Context

In one exemplary implementation, execution of a "what-if" context involves applying a transactor on a design and recording affected area as a context result.

e. Execution of a "Powerspec" Context

In one exemplary implementation, execution of a "powerspec" context involves associating an electrical power intent database instance with an existing hierarchy/module in a design or with a "what-if" context.

11. Exemplary Operation of "Report_Power" Command where C1 has its Own when and where The following paragraphs disclose one exemplary technique for executing the "report_power" command. In particular, the paragraphs explain how the "report power -context C1" is executed where C1 has its own when and where.

In general, power for only those elements/objects that lie in the where region of given context will be reported. More specifically, and according to one exemplary embodiment:

The presently annotated switching activity ("SA") data and power data will be cached temporarily.

New SA data will be computed and annotated on the full design according to the given when condition.

The reporting command "report_power" will call power analysis engine APIs to compute power for interested objects. (In particular implementations, no change in get_power APIs is required because the desired context's SA has already been placed on the netlist.)

Report_power will report interested objects power to the user in a new format (a new format is used in order to show power for instances and nets all together).

The following values will be cached with a context ID (not for the full design but for reported objects only): prob, td, dyn_power, lk_power, delay, slack. In certain implementations, SA data for the full design is not cached. Instead, it is recomputed if required in the future. However, SA data is cached for only those objects that are in the where domain of this context. This caching is useful for building chained contexts where these cached values will be referred using this context scope The original SA and power data from the temporary cache is restored.

12. Exemplary Operation of "Report_Power" Command where C1 has its Own when and where In general, power only for those hierarchical instances (and containing items) that are replaced with new what_if hierarchies and/or transactors are reported.

13. Expectation of when What-if Command is Called

In certain example implementations, a change in the netlist will be made in-place. Further, the new what-if object hierarchy (transactor specified during what_if) will participate in reporting.

14. Semantics of the "Get_Sa -Context C" where Context "C" is a "What-If" Context In general, the get_sa command includes information that identifies the objects for which it needs to compute a SA value. This information can be provided with options, such as -signals, -port, etc. But in the presence of a context C, this information comes from the context itself. Here, the answer is present in the context C (a SA will be reported for all those objects (e.g., -signals, -port) that are replaced due to what-if).

For example, if context C is a what-if context that replaces all the memories in a design with memory banks, then the get_sa command will report SA values for each port/signal present in the memory bank implementation. Further, the default SA values present on the netlist will be used because, in this example, the user has provided a context which does not talk about a specific "when" condition. Hence, there is no need to recompute/reannotate the SA on the design.

15. Representing a Context as Part of a Software Layer

In this section, example embodiments of a general context object in C++ are described. In certain implementations, any C++ client can create the context object. In certain implementations, the context object specifies a list of objects (from "where" or "what-if") and a list of timestamps (from "when"). In particular implementations, the context object alone does not allow any kind of context chaining, but the PQI layer (as described above) provides this functionaltity. In other embodiments, the object itself allows for chaining.

As also discussed elsewhere herein, the PQI can have its own PQIContexts, which are flexible and provide additional functionality, including context chaining. A PQIContext can eventually be turned into a general context when it is asked to set.

Figure 15:
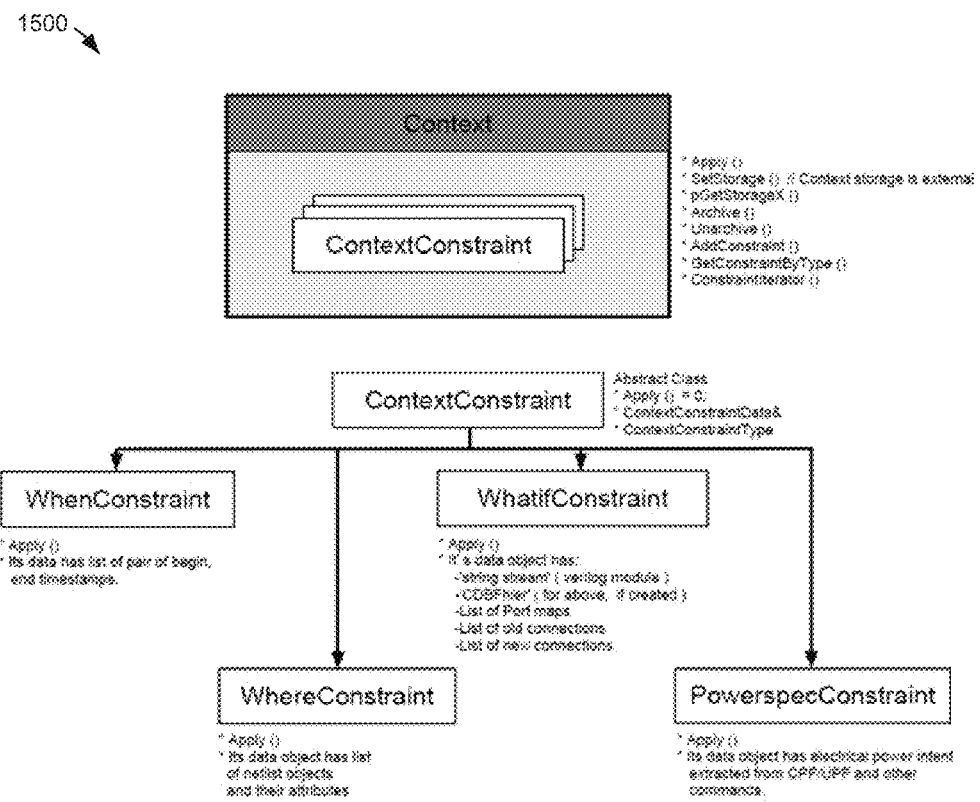
FIG. 15 is diagram showing that, in some embodiments, a context is a construct of constraints.

As shown in diagram 1500 of FIG. 15, and according to certain exemplary implementations, a context is a construct of constraints (or specifications). In the illustrated embodiment, there are various types of constraints that can be linked with a context (e.g., a "when" constraint and a "where" constraint might be attached to a same context at the same time). Constraints attached to a context are known as ContextConstraints. These ContextConstraints have references to their data ("data used to set the constraint"+"data computed under this constraint"), but they do not own the data. Initially the ownership of ContextConstraintData is with the context creator itself (e.g., PQI), but when a context is registered to global space, with the help of ContextManager, the ownership of data is transferred to GlobalContextStorage. It is the ContextManager's responsibility to notify GlobalContextStorage to clear, archive, and/or unarchive a ContextConstraintData when appropriate.

A ContextConstraint does not own its data, but it knows how to use it (e.g., how to apply that constraint on a design using that data).

16. Example ContextManager Embodiments

In certain example implementations, the ContextManager, which is outside the PQI layer, manages all contexts in global space. Any functional layer other than PQI (e.g., CPF/UPF) can communicate with the ContextManager to register new contexts or to access existing contexts.

The ContextManager communicates with the GlobalContextStorage class to validate, invalidate, lock, unlock, archive, and/or unarchive ConstraintData of a context. In particular implementations, the ContextManager can facilitate any one or more of the following functionalities:

boolRegisterContext (Context*)
    boolSetAsCurrentContext (Name)
    Context* GetCurrentContext ( )
    Context* GetContextByName (Name)
    ContextStorage*GetContextStorage (Name)
    int Has ContextWithName ( )//0 for no such context, 1 for has context, 2 context is chived.
    bool LockContext ( )//Storage for this context can't be modified
    bool UnlockContext (Name)//Storage for this context can be modified now
    bool IsLocked (Name)
    Contextfterator ( )
    Archive Context (Name)
    Context* UnArchiveContext (Name)

17. Further Example Techniques for Creating a Context Via PQI

This section describes an exemplary technique for how the PQI creates a context object from a command line. The data in the command line can be generated through a suitable user interface, such as any of the example user interface described above. Identities involved in the procedure of creating a C++ context object comprise one or more of the following:

Tcl command create context
    PQIContextManager
    PQIContextCreator
    CreateCtxInputParser
    PQIToken
    PQITokenTree
    PQIContextConstraint
    PQIContext
    AdaptorPQICtxToCtx a. TclCommand Create_Context

This command can be implemented in c++. The three constraints (-when, -where, and -what-if) given in the form of strings can be used to create PQIContext. PQIContexts can be managed by PQIContextManager. A PQIContext can be converted into a context object.

b. PQIContextManager

This class manages PQIContexts. Below is a list of one or more functionalities that can be exposed by this class.

PQIContext* CreatePQIContext ("Name", std::list<ConstraintString*>);
"when_string", "whatif_string", NULL /*where string */)
The function PQIContextManager::CreatePQIContext uses
PQIContextCreator to create a PQIContext out of raw strings.
PQIContext* GetPQIContextByName ("Name");
boolHasContextWithName ("Name")
Context* AdaptorPQICtxToCtx ( )

c. POIContextCreator

Figure 16:
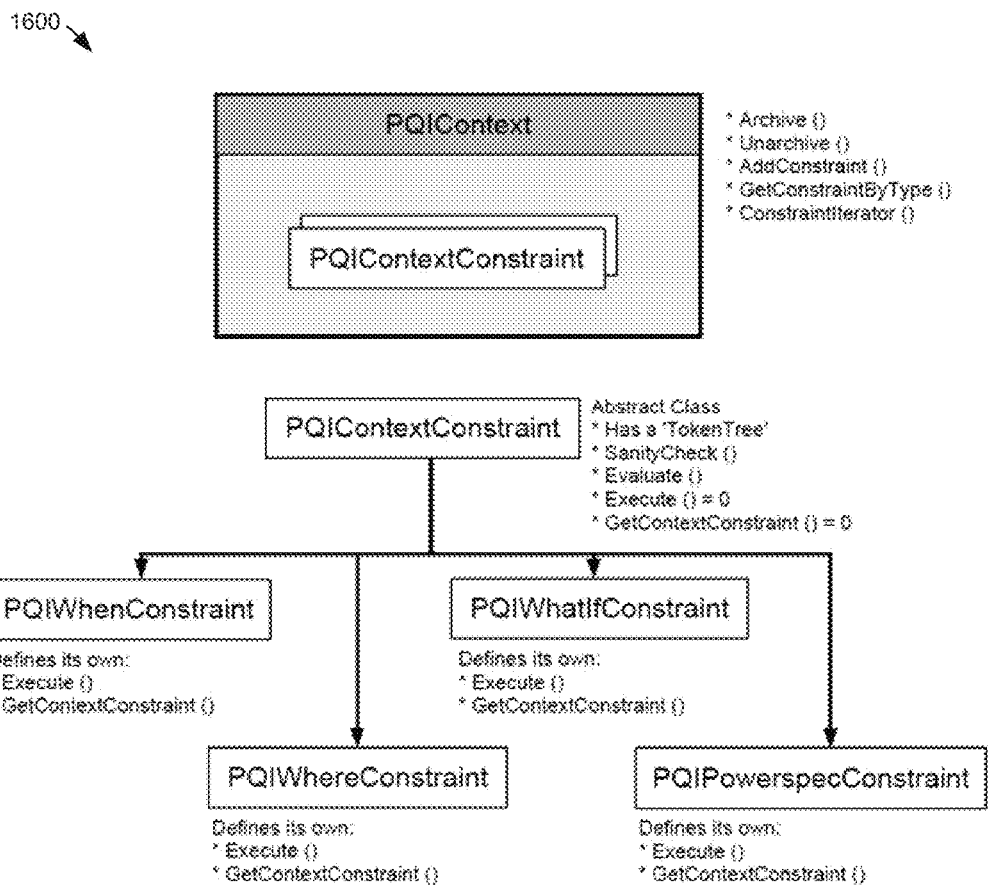
FIG. 16 is a diagram showing additional details concerning the example PQIContext class and the example PQIContextConstraint class.

With the help of Create CtxInputParser, this class converts each raw string (constraint strings) into a token tree. These token trees can be kept in an individual PQIContextConstraint object. These PQIContextConstraints form a PQIContext. The diagram 1600 in FIG. 16 shows additional details concerning the example PQIContext class and the example PQIContextConstraint class.

d. CreateCtxInputParser

This is a class that will take a string as an input and scan it to find PQITokens. These PQITokens are arranged to form a PQITokenTree. In a first phase of PQI operation, CreateCtxInputParser only identifies a TclListToken, and the PQITokenTree contains only one node (TclList Token).

e. PQIToken

Figure 17:
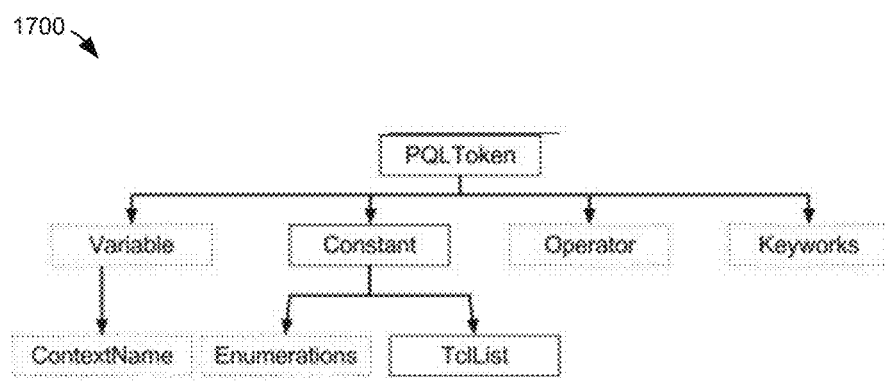
FIG. 17 is a diagram showing illustrating one manner for classifying tokens.

A substring (e.g., &, I, !, &&, ||, ~, and the like) is identified as an OperatorToken; a string which is already registered as a context is identified as ContextName Token. FIG. 17 is a schematic block diagram 1700 illustrating one manner for classifying tokens.

f. PQITokenTree

Figure 18:
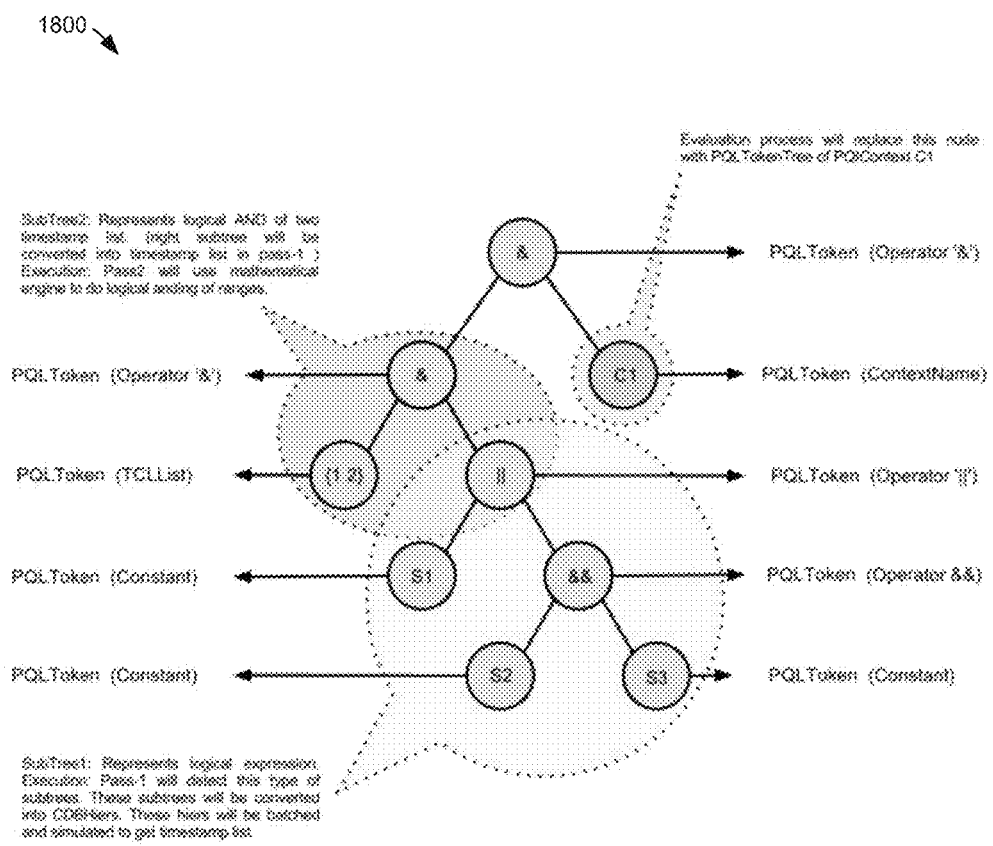
FIG. 18 is a schematic block diagram illustrating an exemplary token tree.

PQITokenTree is a construct of PQITokens, where non-leaf nodes are of type Operator. FIG. 18 is a schematic block diagram 1800 illustrating an exemplary token tree.

g. PQIContextConstraint

PQIContextConstraint is an abstract class. It may exist in four forms: PQI When Constraint, PQIWhereConstraint, PQIWhatIfConstraint, and PQIPowerSpecConstraint. In certain implementations, PQIContextConstraint contains a PQITokenTree. The diagram 1600 in FIG. 16 shows additional details concerning the example PQIContextConstraint class.

h. PQIContext

PQIContext comprises a list of PQIContextConstraints. What constraints a PQIcontext has decides its type. In certain exemplary embodiments, a PQIContext cannot be applied on a design; however, it may be used to create a general context, which can be applied on design.PQIContext provides the flexibility of combining and/or chaining contexts. It is not necessary that every PQIContext gets translated into a context. For example, in certain implementations, those contexts that are applied using the set_context command are converted into a generic context. The PQIContext can object facilitate one or more of the following functionalities:
Archive ( )
Unarchive ( )
AddConstraint ( )
GetConstraintByType ( )
ConstraintIterator ( )

i. AdaptorPQICtxToCtx

As described above, a PQIContext cannot be applied on a design, but a general context can be applied on a design. The class AdaptorPQICtxToCtx converts a PQIContext into a generic context. The generic context can be registered to ContextManager to be available in global space. In particular implementations, there will be no processing for PQIContextConstraints until a PQIContext is asked to be converted into a context. This is the time when all the PQIContextConstraints inside a PQIContext get executed.

18. Applying a Context Via TclComm and Set_Context

In certain embodiments, the command set_context takes a context name as input and searches for this context in the PQI layer. If a PQIContext is found and its respective global context does not exist, AdaptorPQICtxToCtx can act and make a "respective generic context" available in global space. Once a generic context is created, it can be applied on a design. In general, applying a context on a design means setting all the constraints on the design as proposed by a context. The apply function provided by the context class iterates over its list of constraints and calls their apply ( ) functions. In particular implementations, every constraint has its own apply ( ) function (e.g., the constraints know how to apply themselves).

a. Applying ContextConstraint of Type "When"

As described above, a WhenConstraint has a list of pairs of begin and end timestamps in the WhenConstraintData object. Further, it knows how to apply itself on a design. Additionally, its apply( ) function uses a range-aware fsdb2sa engine to annotate the SA (when) on a design.

b. Applying ContextConstraint of Type "Where"

In certain embodiments, the apply( ) function of a ContextConstraint of type "where" is an empty function.

c. Applying ContextConstraint of Type "What-If"

In certain embodiments, the apply( ) function of a WhatIfConstraint performs one or more of the following tasks:
check for a replacement sub-hierarchy in WhatIfConstraintData. If the hierarchy is not set and/or created, it will generate a replacement sub-hierarchy using stringstream (which defines a verilog module).
Modify the design to instantiate this hierarchy in the design and make and break necessary connections.
Cache deleted connections (edges) as strings in the form of a source port hier_name to sink ports hier_names in a map in WhatIfConstraintData.
similarly, cache newly created connections (edges) in the form of source port hier_name to sink ports hier_names in a map in WhatIfConstraintData. (In certain implementations, this caching is used to allow for the rollback of a "what-if" context.

Add a Where Constraint to the context where the WhereConstraintData comprises the elements present in newly instantiated hierarchies.

d. Applying ContextConstraint of Type "Powerspec"

In certain embodiments, the apply( ) function of a PowerSpecConstraint performs one or more of the following tasks:

Check for new properties specified in PQIPowerSpecConstraint, such as Voltage scaling, Voltage islands, Variable VDD, multiple threshold voltages, power gating suggestions, etc. Annotate these properties on specified hierarchies/instances of the design such that the power analysis engine can compute each hierarchy power differently as per specified electric intent.

19. Context Rollback a. "When" Type

To rollback a "when" context, and in some embodiments, the annotated SA is reset, the annotated power is reset, and the cached default SA on the netlist is applied.

b. "What-If" Type

In some embodiments, if no optimization is performed (e.g., no netlist changes are done since the context is applied), the changes are undone by disconnecting the new what-if hierarchy and making old connections. In particular implementations, old connections that were disconnected are cached in WhatIfConstraintData.

c. "Powerspec" Type

In some embodiments, the annotated electrical power intent properties on all individual hierarchies are reset to default. For instance, the can default point to properties extracted from the original CPF/UPF (if any).

20. Context Storage—GlobalContextStorage

In certain embodiments, context storage (or the storage of data of each constraint of a context) is independent of a context object. This data is kept in a separate class named GlobalContextStorage. The GlobalContextStorage has a name-based map storage where key is the context name and the value is a map of ContextConstraintType and ContextConstraintData.

a. ContextConstraintData

In certain embodiments, the ContextConstraintData comprises When ConstraintData, Where ConstraintData, and WhatIfConstraintData. In particular implementations, the WhenConstraintData comprises a list of pairs of begin and end time stamps. In some implementations, the WhereConstraintData comprises a map of hashed net-list object name and their base pointer objects. For example, the following map can be used:

TABLE 2

| Exemplary WhereConstraintData Map | | | | | | | | | |
|---|---|---|---|---|---|---|---|---|---|
| name | Type | prob | Td | dyn_power | lk_power | port | delay | slack | width |
| Signal Yes | Yes | Yes | Yes | Yes | Yes | | Yes | Yes | Yes |
| Port Yes | Yes | Yes | Yes | | | | Yes | Yes | Yes |
| instance Yes | Yes | | | Yes | Yes | Yes | Yes | Yes | Yes |
| Module Yes | | | | | | Yes | | | |

In particular implementations, WhatIfConstraintData comprises a list of {string stream that defines a transactor, pointer to respective sub-hierarchy if created, list of portmaps that defines new connections to this hierarchy in design at various places, deleted connections/edges map pet instantiation, new connections/edges map per instantiation}.

21. Archiving and Unarchiving a Context

The archiving and unarchiving of a context can be achieved with standard serialization techniques of objects. In this example architecture, the data linked with a context is independently stored and always referred with IDs.

IV. Concluding Remarks

Having illustrated and described the principles of the disclosed technology, it will be apparent to those skilled in the art that the disclosed embodiments can be modified in arrangement and detail without departing from such principles. For example, any one or more aspects of the disclosed technology can be applied in other embodiments. In view of the many possible embodiments to which the principles of the disclosed technologies can be applied, it should be recognized that the illustrated embodiments are only preferred examples of the technology and should not be taken as limiting the scope of the invention. Rather, the scope of the invention is defined by the following claims and their equivalents. I therefore claim as my invention all that comes within the scope and spirit of these claims and their equivalents.

What is claimed is:

1. A method for power analysis of a circuit design using a chained set of contexts, comprising:
by a computer:
receiving a first power context for a power analysis query from a user;
receiving a second power context for a power analysis query from the user;
receiving a request from the user to combine the first power context with the second power context into a chained set of contexts for use in a single power analysis query of a circuit design;

combining the first power context with the second power context into the chained set of contexts; and analyzing the single power analysis query of the circuit design by one or more power analysis engines, the single power analysis query comprising the chained set of contexts;

wherein the first power context and the second power context, combined in the chained set of contexts used in the single power analysis query of the circuit design, respectively comprise distinct ones of: (a) a specification of a power mode or time of interest for the circuit design; (b) a specification of components in the circuit design; (c) a specification of one or more new components not currently in the circuit design; or (d) a specification of a power intent for the circuit design.

2. One or more non-transitory computer-readable media storing computer-executable instructions, which when executed by a computer cause the computer to perform the method of claim 1.

3. A method, comprising:
by a computer:
providing a power query interface layer between one or more power analysis engines and a user, the power query interface layer allowing the user to generate two or more unexecuted power contexts of distinct types for analyzing at least a portion of a circuit design;

generating a power analysis query for execution by the one or more power analysis engines, the power analysis query comprising a combination of the unexecuted power contexts of distinct types; and executing the power analysis query by the one or more power analysis engines.

4. The method of claim 3, wherein the unexecuted power contexts comprise two or more of: (a) a power context specifying a power mode or time of interest for the at least a portion of a circuit design; (b) a power context for specific components in the at least a portion of the circuit design; (c) a power context for one or more new components not currently in the at least a portion of the circuit design; or (d) a power context for a power intent for the at least a portion of the circuit design.

5. The method of claim 3, wherein the power query interface layer comprises a context database for storing the two or more unexecuted power contexts.

6. The method of claim 3, wherein the unexecuted power contexts comprise a power context that specifies one or more new components not currently in the circuit design and that, when executed, causes a modification to a netlist for the at least a portion of the circuit design.

7. The method of claim 6, wherein the power query interface layer comprises a database for storing the netlist before modification and for facilitating restoration of the netlist to the state before modification if the one or more new components are rejected by the user.

8. The method of claim 3, wherein the power query interface layer further comprises a simulation database for storing results from previously executed power analysis queries and for facilitating use of the results in subsequent power analysis queries.

9. One or more non-transitory computer-readable media storing computer-executable instructions, which when executed by a computer cause the computer to perform a method, the method comprising:
providing a power query interface layer between one or more power analysis engines and a user, the power query interface layer allowing the user to generate two or more unexecuted power contexts of distinct types for analyzing at least a portion of a circuit design;

generating a power analysis query for execution by the one or more power analysis engines, the power analysis query comprising a combination of the unexecuted power contexts of distinct types; and executing the power analysis query by the one or more power analysis engines.

10. The one or more non-transitory computer-readable media of claim 9, wherein the unexecuted power contexts comprise two or more of: (a) a power context specifying a power mode or time of interest for the at least a portion of a circuit design; (b) a power context for specific components in the at least a portion of the circuit design; (c) a power context for one or more new components not currently in the at least a portion of the circuit design; or (d) a power context for a power intent for the at least a portion of the circuit design.

11. The one or more non-transitory computer-readable media of claim 9, wherein the power query interface layer comprises a context database for storing the two or more unexecuted power contexts.

12. The one or more non-transitory computer-readable media of claim 9, wherein the unexecuted power contexts comprise a power context that specifies one or more new components not currently in the circuit design and that, when executed, causes a modification to a netlist for the at least a portion of the circuit design.

13. The one or more non-transitory computer-readable media of claim 12, wherein the power query interface layer comprises a database for storing the netlist before modification and for facilitating restoration of the netlist to the state before modification if the one or more new components are rejected by the user.

14. The one or more non-transitory computer-readable media of claim 9, wherein the power query interface layer further comprises a simulation database for storing results from previously executed power analysis queries and for facilitating use of the results in subsequent power analysis queries.

* * * * *